United States Patent [19]

Hoshi et al.

[11] Patent Number: 4,733,065
[45] Date of Patent: Mar. 22, 1988

[54] OPTICAL HEAD DEVICE WITH DIFFRACTION GRATING FOR SEPARATING A LIGHT BEAM INCIDENT ON AN OPTICAL RECORDING MEDIUM FROM A LIGHT BEAM REFLECTED THEREFROM

[75] Inventors: Hiroaki Hoshi, Kawasaki; Naosato Taniguchi, Yokohama; Kiyonobu Endo, Yokohama; Tetsuro Kuwayama, Yokohama; Hiroshi Osawa, Yokohama; Yasuo Nakamura, Tokyo, all of Japan

[73] Assignees: Canon Kabushiki Kaisha, Tokyo; Canon Denshi Kabushiki Kaisha, Saitama, both of Japan

[21] Appl. No.: 748,342

[22] Filed: Jun. 24, 1985

[30] Foreign Application Priority Data

| Jun. 27, 1984 | [JP] | Japan | 59-132293 |
| Jun. 27, 1984 | [JP] | Japan | 59-132294 |
| Jul. 4, 1984 | [JP] | Japan | 59-138368 |
| Jul. 4, 1984 | [JP] | Japan | 59-138369 |
| Feb. 5, 1985 | [JP] | Japan | 60-19193 |
| Feb. 5, 1985 | [JP] | Japan | 60-19194 |
| Apr. 9, 1985 | [JP] | Japan | 60-73590 |
| Apr. 9, 1985 | [JP] | Japan | 60-73591 |
| Apr. 9, 1985 | [JP] | Japan | 60-73592 |
| Apr. 15, 1985 | [JP] | Japan | 60-78560 |
| Jun. 14, 1985 | [JP] | Japan | 60-129482 |
| Jun. 14, 1985 | [JP] | Japan | 60-129483 |
| Jun. 14, 1985 | [JP] | Japan | 60-129484 |

[51] Int. Cl.$^4$ ............... G01J 1/20; G11B 7/09
[52] U.S. Cl. ........................ 250/201; 369/45
[58] Field of Search ............. 250/201; 369/44–46, 369/106, 109–112

[56] References Cited

U.S. PATENT DOCUMENTS

| 3,622,220 | 11/1971 | Kogelnik . | |
| 4,358,200 | 11/1982 | Heemskerk et al. | 369/45 |
| 4,403,318 | 9/1983 | Nagashima et al. | 369/45 |
| 4,409,631 | 10/1983 | Matsumoto | 369/110 |
| 4,458,980 | 7/1984 | Ohki et al. . | |
| 4,525,625 | 6/1985 | Abe | 369/45 |

FOREIGN PATENT DOCUMENTS

59084A1 1/1982 European Pat. Off. .
57-155508 9/1982 Japan .

*Primary Examiner*—Edward P. Westin
*Attorney, Agent, or Firm*—Fitzpatrick, Cella, Harper & Scinto

[57] ABSTRACT

An optical head device comprises a light source, condensing optics for condensing a light beam emitted from the light source on an optical recording medium, a photodetector for detecting the light of the light beam reflected from the recording medium, and a beam splitter having a diffraction grating arranged in the optical path of the light beam entering the recording medium from the light source along a plane substantially perpendicular to the optical axis of the incident light beam to cause the light reflected light from the recording medium to be diffracted by the diffraction grating and directed to the photodetector.

20 Claims, 82 Drawing Figures

FIG. 18
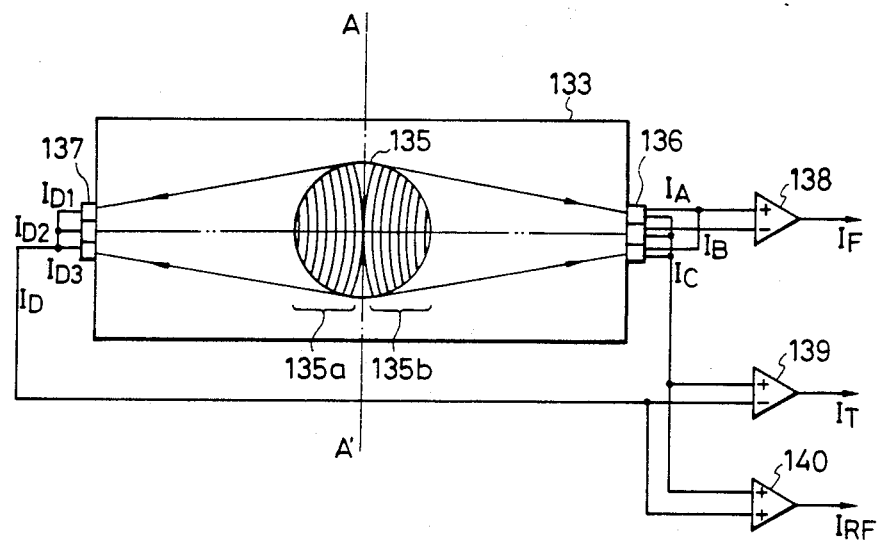
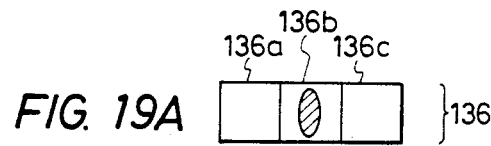
FIG. 19A
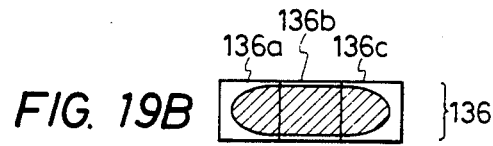
FIG. 19B
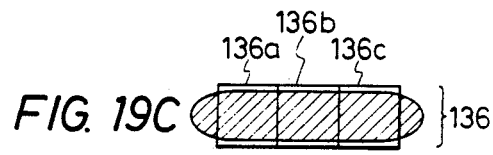
FIG. 19C

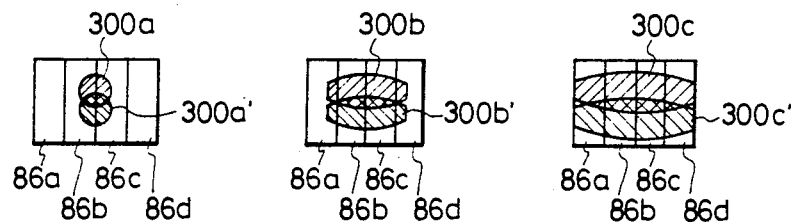
FIG. 42A   FIG. 42B   FIG. 42C
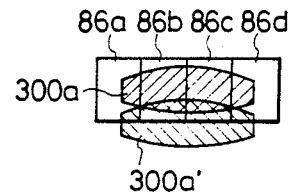
FIG. 43A
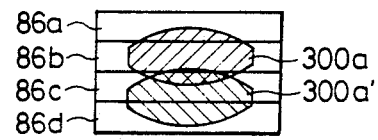
FIG. 43B
FIG. 44
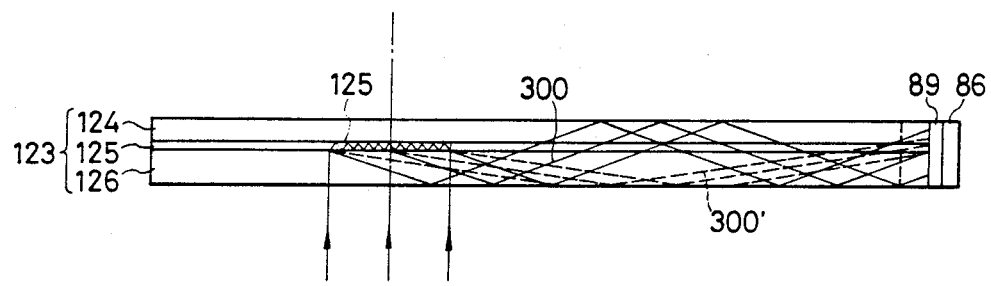

OPTICAL HEAD DEVICE WITH DIFFRACTION GRATING FOR SEPARATING A LIGHT BEAM INCIDENT ON AN OPTICAL RECORDING MEDIUM FROM A LIGHT BEAM REFLECTED THEREFROM

BACKGROUND OF THE INVENTION

1. Field of the Invention

This invention relates to an optical head device for applying a light beam to the information recording surface of an information carrier and effecting the detection or recording of information, and in particular to an optical head device which is compact, light in weight and suitable for mass production.

2. Description of the Prior Art

According to the prior art, an optical head device is constructed as shown, for example, in FIG. 1 of the accompanying drawings. A divergent light beam emitted from a laser light source 1 enters a collimator lens 2 and becomes a parallel light beam, and enters a polarizing beam splitter 3. The polarizing beam splitter 3 has a characteristic of transmitting therethrough about 100% of a linearly polarized light having a plane of vibration in a particular direction and reflecting about 100% of a linearly polarized light having a plane of vibration in a direction orthogonal to said particular direction. The linearly polarized light transmitted through this polarizing beam splitter 3 passes through a quarter wavelength plate 4 and becomes a circularly polarized light beam, and is condensed on an information recording surface 7 provided on the substrate 6 of an information carrier, by an objective lens 5, and forms thereon a spot having a spot diameter of about 1 μm. Also, the light beam reflected by this information recording surface 7 passes through the objective lens 5 and becomes a parallel light beam, and passes through the quarter wavelength plate 4 and becomes a linearly polarized light beam having a plane of vibration orthogonal to that during incidence, and again enters the polarizing beam splitter 3. The polarizing beam splitter 3 acts as a beam splitter due to its characteristic as described above, and reflects the light reflected from the information recording surface 7 and separates it from the incident light, and directs it as a convergent light beam to a photodetector 10 through a sensor lens 8 and a cylindrical lens 9.

To record information by the use of such an optical head device, the laser light source 1 is driven in accordance with an information signal and the light incident on to the information recording surface 7 is modulated, thereby effecting the recording. Also, to detect the information, an unmodulated light beam is applied to the information recording surface 7 on which the information is recorded by means of concavo-convex pits or variations in reflectance, and the reflected light subjected to modulation by this recorded information is detected by the photodetector 10, whereby the information is reproduced.

Also, where the information magnetically recorded on the information recording surface is to be read out by the use of the magneto-optical effect, a polarizing beam splitter 11 as shown in FIG. 2 of accompanying drawings is used instead of the aforedescribed polarizing beam splitter 3 and the quarter wavelength plate 4. The polarizing beam splitter 11 comprises rectangular prisms 12 and 13 and a reflecting film 14 which is formed so as to reflect or transmit P-polarized light and S-polarized light at a suitable percentage. For example, as regards the P-polarized light beam 15 entering the polarizing beam splitter 11, 30% of the energy thereof is reflected by the reflecting film 14 and becomes a light beam 17, and a light beam 16 of remaining 70% is transmitted and is condensed on the recording surface of the an opto-magnetic recording medium through an objective lens (not shown). A reflected light beam 18 having its plane of polarization rotated (Kerr rotation) in conformity with the information on the recording surface again enters the polarizing beam splitter 11. The component modulated by the Kerr rotation is S-polarized light and is reflected by about 100% by the reflecting film 14. On the other hand, 70% of the P-polarized component of the reflected light 18 is transmitted through the reflecting film 14 and only the remaining 30% is reflected thereby and is directed to the photodetector with said S-polarized component. By thus increasing the modulated component (S-polarized light) relative to the original-polarization component (P-polarized light) of the incident light, the angle of Kerr rotation is apparently increased and signal read-out with a high S/N ratio becomes possible.

Also, in the optical head device, autofocusing for focusing the light from the light source consistently on the information recording surface is effected to record information very densely on the information recording surface and detect the highly densely recorded information. The device shown in FIG. 1 is an example using the conventional astigmatism method. The cylindrical lens 9 causes the reflected light to create astigmatism. Also, the photodetector 10 has its light-receiving surface divided into four parts and is so arranged that a circular light intensity distribution is created on the photodetector 10 when the information recording surface 7 is in the in-focus position of the objective lens 5, that is, when the light spot is stopped down to a predetermined size of the order of 1 μm on the information recording surface 7. As a result, when the information recording surface 7 is moved back and forth from the focus position of the objective lens 5, the light distribution on the photodetector 10 changes into an elliptical shape having its major axes orthogonal to each other. Accordingly, by comparing the outputs of the light-receiving surfaces of the photodetector 10 and detecting the change in the light distribution, there is obtained a focus error signal, and the objective lens 5 is moved along the direction of the optical axis by an actuator, not shown, in accordance with the focus error signal, whereby auto-focusing is accomplished.

However, the conventional optical head device as described above requires a sensor lens or the like, and this has hindered achievement of compactness and low cost in the device. Also, to obtain a good signal from the photodetector, it is necessary to place an optical element such as the sensor lens or the like at an accurate position and angle relative to the optical axis of the detected light, and this has complicated the assembly and adjustment. Further, both of the aforedescribed polarizing beam splitters 3 and 11 are made by joining the opposite surfaces of two prisms together and therefore, complicated working and alignment adjustment are necessary, and this has led to the disadvantage that it is difficult to reduce the cost of the device. Also, these polarizing beam splitters are substantially cubic in shape, and this has been a factor which impedes the thinning of the device when such polarizing beam splitters are used in an optical head device or the like.

An optical head device which does not require the above-mentioned sensor lens or the like is proposed in Japanese Laid-Open Application No. 8145/1984. In this device, the joined surface of a prism type beam splitter as described above is curved and endowed with a condensing action as a concave mirror. In this device, however, when making the beam splitter, prisms each having a convex surface or a concave surface must be individually polished and then assembled together, and this has not been suitable for mass production. Further, a reflecting film of polarized light dependency is provided on the joined surface of the beam splitter, but where the joined surface is made into a spherical surface or a cylindrical surface, the angle of incidence of light onto this reflecting film differs from location to location and the polarizing characteristic varies. Accordingly, strict polarized light dependency cannot be expected from such a construction.

On the other hand, examples using a volume type diffraction grating in place of the aforementioned prism type beam splitter are described in Japanese Laid-Open Patent Application No. 155508/1982 and U.S. Pat. No. 3,622,220. The construction of an optical head device using such a volume type diffraction grating is shown in FIG. 3 of the accompanying drawings. In FIG. 3, a parallel light beam 22 emitted from a light source unit 21 including a laser light source and a collimator lens enters a volume type diffraction grating 23 placed at an angle of 45° relative to said light beam. The light beam 22 is S-polarized light having a plane or vibration in a direction perpendicular to the plane of the drawing sheet. The volume type diffraction grating 23 has a pitch substantially equal to $\lambda/1.414$, where $\lambda$ is the wavelength of the incident light, and deflects the light beam 22 at an angle of diffraction of 90°. At this time, the diffraction efficiency for S-polarized light is approximately 100% and the diffraction efficiency for P-polarized light is approximately 0%. Accordingly, the light beam 22 is almost diffracted, and is transmitted through a quarter wavelength plate 24 and becomes a circularly polarized light beam, and forms a spot on the information recording surface 27 of an optical disc 26 with the aid of an objective lens 25.

Information is recorded on the information recording surface 27 by a variation in reflectance or the like, and the reflected light therefrom is subjected to light amount modulation in accordance with said information. This reflected light is transmitted through the lens 25 and the quarter wavelength plate 24 and becomes P-polarized light and enters a photodetector 28 without being diffracted by the diffraction grating 23, and said information is read.

However, since in the construction shown in FIG. 3, the angle of diffraction of the volume type diffraction grating is set to approximately 90°, this construction cannot be used to read the information from an optomagnetic recording medium. The reason will hereinafter be explained. In FIG. 3, where information is magnetically recorded on the information recording surface 27, the quarter wavelength plate 24 is removed from the optical path. The S-polarized light beam entering from the diffraction grating is reflected as a light beam whose plane of polarization has been rotated (Kerr rotation) by the same amount in the reverse direction, depending on whether the direction of magnetization of the information recording surface 27 is upward or downward. This angle of Kerr rotation is an angle as small as the order of 1° and thus, most of the reflected light is an S component and includes small P components different in direction and equal in size. Since the diffraction grating 23 has an angle of diffraction of 90°, the S component of said reflected light is almost diffracted toward the light source unit 21. On the other hand, only the P component created by the Kerr rotation is transmitted intact and enters the photodetector 28. As previously described, the P components corresponding to the direction of magnetization are just opposite in direction and equal in size and therefore, even if an analyzer is provided, at any azimuth angle, in front of the photodetector 28, the light amount transmitted therethrough is the same irrespective of the direction of magnetization and the information cannot be read. Thus, a beam splitter having an appropriate polarizing characteristic is indispensable for the reading of the information on an optomagnetic recording medium, but in the construction according to the prior art, such a beam splitter could not be realized.

Also, in the conventional optical head device, the incident light beam and the diffracted light beam form an angle of 90° with each other within the volume type diffraction grating. Therefore, in the usual form, the incident light is totally reflected on the surface of the diffraction grating and, although not shown in FIG. 3, but in reality, as shown in the aforementioned U.S. Patent, a construction in which a volume type diffraction grating is disposed between rectangular prisms must be adopted and it has been impossible to sufficiently make the best use of the features such as compactness and light weight inherent in a diffraction grating.

FIG. 4 of the accompanying drawings is a schematic view showing still another example of the conventional optical head device proposed in Japanese Laid-Open Patent Application No. 64335/1982. In FIG. 4, a light emitted from a semiconductor laser 31 is collimated by a collimator lens 32 and condensed on an information recording surface 37 on a substrate 36 by an objective lens 35. For the reading of the signal on the information recording surface 37, use is made of the so-called SCOOP system in which the variation in the output of the semiconductor laser 31 caused by a variation in the amount of the return light reflected by the information recording surface 37 and returning to the semicondcutor laser 31 through the same optical path so that during the incidence is detected by a monitoring sensor 45. Also, a sensor lens 41 having a focal length f occupies a part of the pupil plane of the objective lens 35, and part 46 of the reflected light from the information recording surface is made into a convergent light beam 47 by the sensor lens 41 and enters a two-division photodetector 42. The convergent light beam 47 moves to the left and right on the photodetector 42 when the information recording surface 37 has become far from or near to the focus position of the objective lens 35. So, a focus error signal is obtained by subtracting the outputs of the divided light-receiving surfaces by means of a subtractor 43. A focusing actuator 44 is driven by this focus error signal and auto-focus is effected so as to ensure the incident light to be focused onto the information recording surface 37.

In the device shown in FIG. 4, the off-axis light beam of the objective lens is taken out and therefore, the detected light beam greatly acts on the focus deviation and thus, focus error detection of high sensitivity can be accomplished. On the other hand, however, the light beam entering the objective lens 35 from the semiconductor laser 31 is eclipsed and deformed by the sensor lens 41, and this has led to a disadvantage that the spot on the information recording surface 37 becomes large.

FIG. 5 of the accompanying drawings is a schematic view showing yet still another example of the conventional optical head device used for the reading of the information from an opto-magnetic recording medium. In FIG. 5, a light beam emitted from a semiconductor laser 51 (hereinafter simply referred to as LD) is converted into a parallel light beam by a collimator lens 52. The parallel light beam then passes through a beam splitter 53 and is condensed into a spot of a diameter of about $\phi 1$ μm on a recording medium 55 by an objective lens 54. The light beam reflected from the recording medium 55 has its plane of polarization subjected to modulation by the Kerr effect and the Faraday effect and again passes through the objective lens 54, and is separated from the incident light beam by the beam splitter 53. The separated light beam is partly reflected by a second beam splitter 56 and passes through a lens system 57 into an optical sensor 58. The lens system 57 is comprised of conventional systems, for example, an astigmatism system, a knife edge system and a four prism system, and the information of the spacing between the recording medium 55 and the objective lens 54, i.e., AF error signal, is obtained therefrom. Also, the deviation with respect to the information track, i.e., AT error signal, is obtained by the conventional push-pull method or the like. These error signals are fed back to the driving system (generally called the actuator), not shown, of the objective lens and tracking is accurately effected at an accurate focus position, whereby detection or recording of the signals is accomplished.

The remaining light beam passing through the second beam splitter 56 passes through a half wavelength plate 59 and is divided into two directions by a polarizing beam splitter 60. If the half wavelength plate 59 is disposed with its optical crystal axis inclined by 22.5° with respect to the polarization axis of the incident light beam, the light amounts divided into two by a polarizing beam splitter 60 are equal to each other and such half wavelength plate becomes equivalent to a polarizing plate disposed with the respective light beams being endowed with transmission axes of 45° and −45°. The light beams divided into two are converged on signal detecting sensors 63 and 64 by sensor converging lenses 61 and 62, respectively, and the electrical signals from the signal detecting sensors 63 and 64 are differentiated (differential detection), whereby detection of the information signal on the recording medium 55 can be accomplished.

However, the optical head device shown in FIG. 5 can detect signals of good S/N ratio by differential detection while, on the other hand, it requires a number of parts and thus has been disadvantageous in making the device compact and low in cost.

SUMMARY OF THE INVENTION

It is an object of the present invention to provide an optical head device which is light in weight and compact (thin).

It is another object of the present invention to provide an optical head device which is simple to optically adjust and inexpensive and excellent in mass productivity.

It is still another object of the present invention to provide an optical head device in which the reflected light from an information recording surface can be partly taken out into a photodetector without affecting the light incident on the information recording surface.

It is yet another object of the present invention to provide an optical head device which is capable of efficiently reading magnetically recorded information by the use of a volume type diffraction grating.

It is a further object of the present invention to provide an optical head device which is simple in construction and in which signals of high S/N by differential detection can be obtained.

The above objects of the present invention are achieved by constructing the optical head device of a light source, condensing means for condensing a light beam emitted from said light source on an optical recording medium, a photodetector for detecting the reflected light from said recording medium, and a beam splitter having a diffraction grating arranged in the optical path of the light beam entering the recording medium from said light source along a plane substantially perpendicular to the optic axis of said incident light beam to cause the reflected light from said recording medium to be diffracted by said diffraction grating and directed to said photodetector.

BRIEF DESCRIPTION OF THE DRAWINGS

FIG. 18 is a schematic plan view of the beam splitter shown in FIG. 17.

FIGS. 19A, 19B and 19C show the variations in the light amount distribution caused by an error in focusing the photodetector in the sixth embodiment.

FIGS. 42A, 42B, 42C, 43A and 43B show the positional relation between the light-receiving surface of a photodetector and a spot of detected light.

FIG. 44 illustrates the optical path in the beam splitter.

DESCRIPTION OF THE PREFERRED EMBODIMENTS

Some embodiments of the present invention will hereinafter be described in detail with reference to the drawings.

Figure 6:
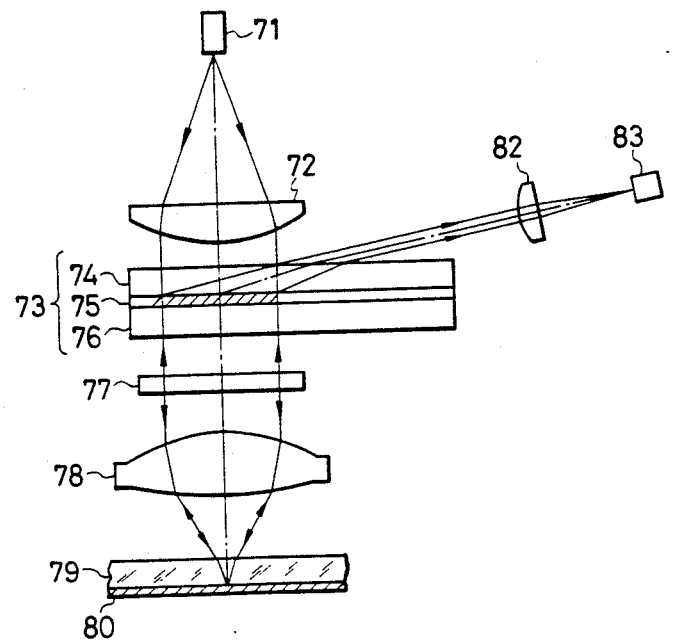
FIG. 6 is a schematic view showing the construction of a first embodiment of the present invention.

FIG. 6 schematically shows the construction of a first embodiment of the optical head device according to the present invention.

In FIG. 6, a light beam emitted from a semiconductor laser 71 is made into a parallel light beam by a collimator lens 72 and enters a beam splitter 73. The beam splitter 73 is comprised of two parallel flat plates 74 and 76 and a diffraction grating 75 formed therebetween. Also, the light from the semiconductor laser 71 is so set that it becomes a P-polarized light beam relative to the beam splitter 73. The linearly polarized light (P-polarized light) transmitted through the beam splitter 73 is transmitted through a quarter wavelength plate 77 and becomes a circularly polarized light beam, and is condensed on an information recording surface 80 by an objective lens 78 through a substrate 79 and forms a minute spot. The recording surface 80 may be either a surface on which information is pre-recorded in the form of concavo-convex pits or of the difference in reflection factor or a medium permitting additional writing in which apertures are opened or phase transition occurs when a light beam of a predetermined light amount enters thereinto.

The light reflected by the recording surface 80 is transmitted through the objective lens 78 and becomes a parallel light beam, and is transmitted through the quarter wavelength plate 77 and becomes a linearly polarized light (S-polarized light) orthogonal to the incident light beam and enters the beam splitter 73. The reflected and light beam, having entered the beam splitter 73, is diffracted by the diffraction grating 75, and the diffracted light is transmitted through a sensor lens 82 to a sensor 83, whereby reading-out of the information recorded on the recording surface 80 or detection of a focus error, a tracking error or the like is effected.

The beam splitter 73 is disposed so as to be substantially perpendicular to the optical axes of the incident light from the semiconductor laser 71 and the reflected light from the recording surface 80, whereby the entire optical head device can be made thin.

Figure 7:
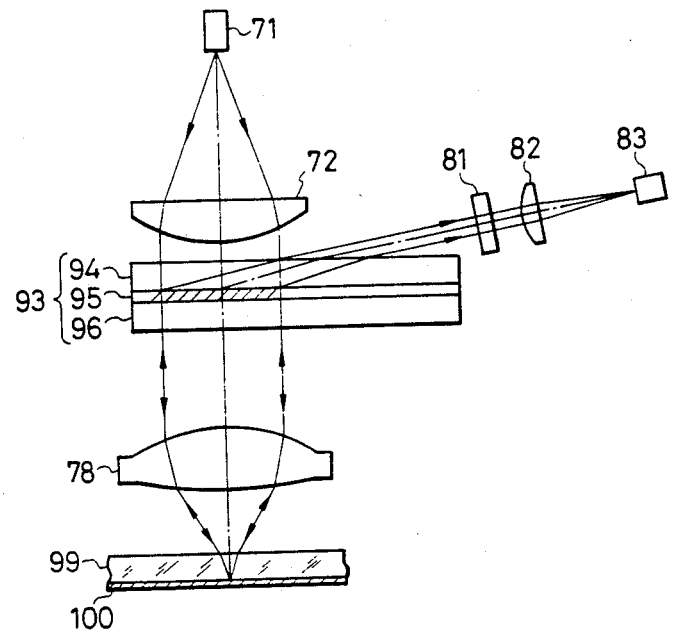
FIG. 7 is a schematic view showing the construction of a second embodiment of the present invention.

FIG. 7 schematically shows the construction of a second embodiment in which the optical head device according to the present invention is used for the reading of information on an opto-magnetic recording medium. In FIG. 7, members similar to those in FIG. 6 are given similar reference numerals. A light beam emitted from a semiconductor laser 71 is made into a parallel light beam by a collimator lens 72 and enters a beam splitter 93. The beam splitter 93 is comprised of two parallel flat plates 94 and 96 and a diffraction grating 95 formed therebetween. Also, the light from the semiconductor layer 71 is set so as to be P-polarized light relative to the beam splitter 93. The linearly polarized light (P-polarized light) transmitted through the beam splitter 93 passes through an objective lens 78 and becomes a convergent light beam, and forms a spot of about 1 μm on a recording surface 100 on which information is magnetically recorded through a substrate 99. The reflected light by the recording surface 100 is modulated as a light beam whose plane of polarization has been rotated in an opposite direction in accordance with the information recorded on the recording surface (namely, by a variation in the direction of magnetization). This reflected light again passes through the objective lens 78 and enters the beam splitter 93 and is diffracted by the diffraction grating 75. The volume type diffraction grating 75 is set so as to have a predetermined diffraction efficiency higher for the Kerr rotation component (S-polarized light) than for the incident light component (P-polarized light) as will later be described and thus, the diffracted light is increased in apparent Kerr rotation angle. This diffracted light passes through an analyzer 81 and the rotation of its plane of polarization is converted into a variation in light amount and detected by a photodetector 83 through a sensor lens 82.

The first and second embodiments can accomplish tracking control and focusing control by their combination with a conventional control method. For example, if the sensor lens 82 is an anamorphic optical system and a four-division photodetector is employed as the photodetector 83, the light amount distribution of the light entering the photodetector varies in conformity with the in-focus state of the spot on the recording surface 100 and this variation is detected by divided light-receiving surfaces, whereby a focus error signal can be obtained. This method is generally well known as an astigmatism method.

Figure 8:
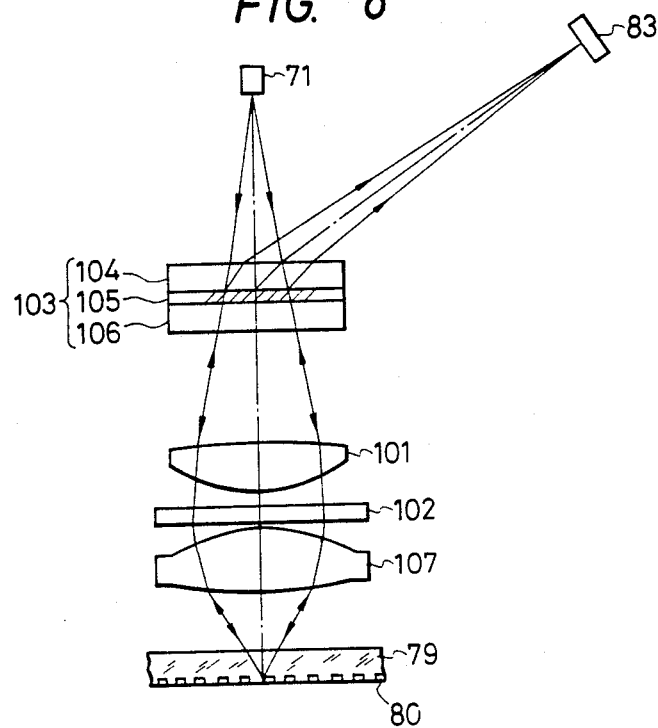
FIG. 8 is a schematic view showing the construction of a third embodiment of the present invention.

FIG. 8 schematically shows the construction of a third embodiment of the present invention. In FIG. 8, members similar to those in FIG. 6 are given similar reference numerals.

A P-polarized light beam from a semiconductor laser 71 is intactly transmitted through a beam splitter 103 and is made into a parallel light beam by a collimator lens 101. The beam splitter 103 comprises parallel flat plates 104 and 106 and a diffraction grating 105 sandwiched therebetween. This diffraction grating 105 exhibits about 100% diffraction efficiency for S-polarized light and exhibits about 0% diffraction efficiency for P-polarized light, as in the first embodiment. The light beam from the collimator lens 101 is made into a circularly polarized light by a quarter-wavelength plate 102 and is condensed on an information recording surface 80 by an objective lens 107 through the substrate 79 of an information carrier. The light beam reflected by the information recording surface 80 travels back along the incidence optical path and passes through the quarter wavelength plate 102 and becomes S-polarized light, and then is diffracted by the diffraction grating 105 of the beam splitter 103 and is directed to a photodetector 83. Again in the present embodiment, the recording and reproduction of information are accomplished in the same manner as in the first embodiment.

The diffraction grating 105 exhibits the action of a sharply concave lens for the reflected light beam and directs the diffracted light to the photodetector 83 by lengthening the focal length of the collimator lens 101. In the present embodiment, by this construction, the spot on the information recording surface is projected in an enlarged form onto the photodetector 83 so that the light amount distribution on the photodetector 83 greatly varies relative to the focus deviation or the tracking deviation of the record carrier. That is, a so-called teletype sensor lens system comprising a combination of convexo-concave lenses is formed by the collimator lens 101 and the lens action of the diffraction grating 105 and the full length thereof is formed compactly, whereafter focus error detection or tracking error detection of high sensitivity is made possible. In the present embodiment, any conventional method may be used for focus error detection, but where use is made, for example, of the astigmatism method described above as the prior art, a four-division photodetector is used as the photodetector 83 and the diffraction grating 105 is endowed with the function of a cylindrical lens in addition to the function of the previously described concave lens, whereby the construction can be simplified.

Figure 9:
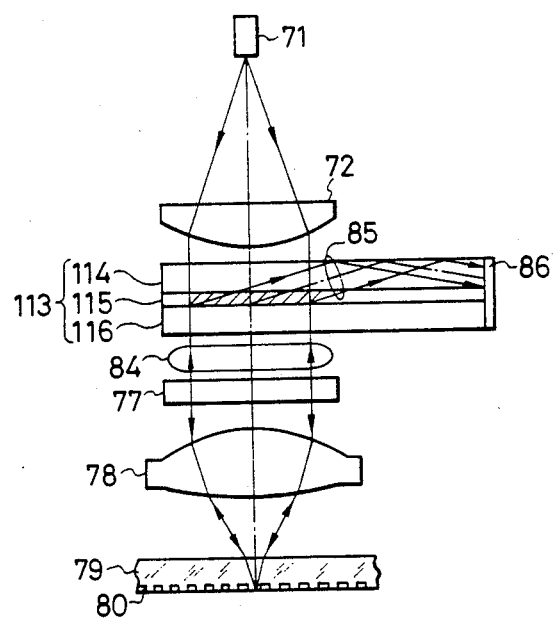
FIG. 9 is a schematic view showing the construction of a fourth embodiment of the present invention.

FIG. 9 schematically shows the construction of a fourth embodiment of the optical head device of the present invention. A light emitted from a semiconductor laser 71 is made into a parallel light beam by a collimator lens 72 and enters a beam splitter 113. The beam splitter 113 is comprised of two parallel flat plates 114 and 116 and a diffraction grating 115 sandwiched therebetween. This diffraction grating is formed so that the diffraction efficiency thereof is approximately 100% for S-polarized light and approximately 0% for P-polarized light. Also, the light from the semiconductor laser 71 is set so as to be P-polarized light relative to the beam splitter. Accordingly, this incident light is hardly diffracted but transmitted and travels to a quarter wavelength plate 77. The light passed through the quarter wavelength plate 77 becomes a circularly polarized light beam and is condensed as a spot of a diameter of about 1 μm on an information recording surface 80 by an objective lens 78 through the substrate 79 of an information carrier. The light beam reflected by the information recording surface 80 passes through the objective lens 78 and becomes a parallel light beam, and is again transmitted through the quarter wavelength plate 77 and becomes S-polarized light vibrating in a direction orthogonal to the direction during the incidence and enters the beam splitter 113. This reflected light 84 is diffracted into a diffracted light beam 85 by the diffraction grating 115 in the beam splitter 113 and is waveguided through the parallel flat plates while repeating total reflection, and enters a photodetector 86. When information is to be recorded, the laser light source 71 is driven in accordance with an information signal and the incident light onto the information recording surface 80 is modulated, thereby effecting the recording of information. When information is to be detected, an unmodulated light is applied to the information recording surface 80 and a reflected light subjected to modulation in accordance with the information recorded thereon is detected by a photodetector 86, whereby the information is reproduced.

Figure 10:
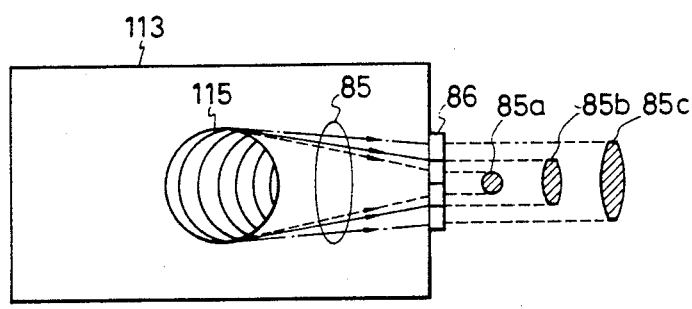
FIG. 10 is a schematic plan view of the beam splitter shown in FIG. 9.

A view of the photodetector 113 of FIG. 9 as seen from the semiconductor laser side is shown in FIG. 10. The diffraction grating in the present embodiment has a lens action having a power in the plane of the drawing sheet of FIG. 10, and the diffracted light 85 is condensed and directed to the photodetector 86.

In the present invention, the use of the term "lens action" refers to the fact that light entering the diffraction grating is diffracted by varying the wave surface shape thereof and the diffracted light is caused to diverge or converge, and this lens action endows the diffraction grating with the function of a sensor lens, a cylindrical lens or the like. The photodetector 86 has its light-receiving surface divided into four parts as shown. The light amount distribution on this light-receiving surface varies in conformity with the in-focus state of the spot on the aforedescribed information recording surface. For example, when the focus position of the objective lens 78 is coincident with the recording surface 80, the reflected light 84 becomes a parallel light beam and the diffracted light 85 becomes such as indicated by solid lines in FIG. 10 and enters the photodetector 86 with a shape as indicated at 85b. Also, when the objective lens 78 is too near to the recording surface or too far from the recording surface, the reflected light 84 becomes a divergent or a convergent light beam, and the diffracted light 85 becomes such as indicated by dots-and-dash lines or broken lines in FIG. 10 and assumes a shape as indicated at 85c or 85a on the photodetector 86. The principle of detecting a focus error signal by the utilization of such a change in the shape of the light beam will hereinafter be described in detail.

Figures 11A, 11B, 11C:
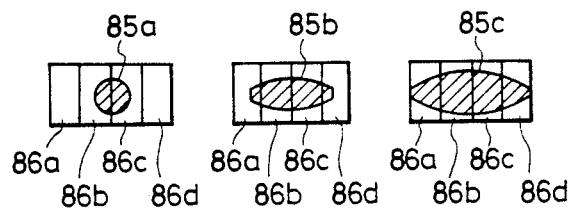
FIGS. 11(A), (B) and (C) show the variations in the light amount distribution on a photodetector by a focus error.
Figure 12A:
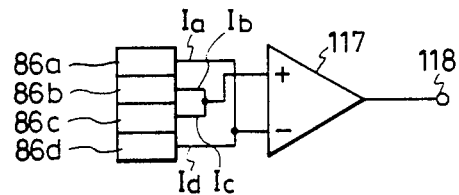
FIGS. 12A and 12B show a focus error detecting electric system and a focus error signal, respectively.
Figure 12B:
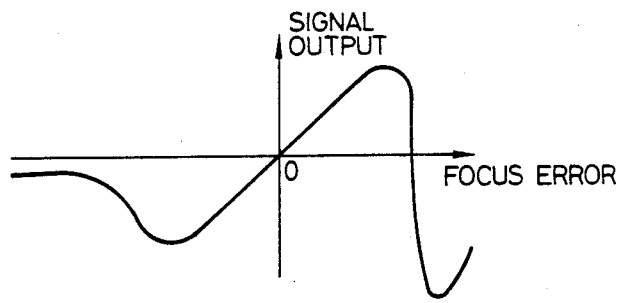

FIGS. 11(A), (B) and (C) are views of the four-division photodetector 86 as seen from the light incidence side. FIG. 11(B) shows the in-focus state and FIGS. 11(A) and (C) show the out-of-focus state. In these Figures, reference characters 86a, 86b, 86c and 86d designate the divided light-receiving surfaces, and the shape of the incident light beam changes as indicated at 85a, 85b and 85c. When the outputs from the light-receiving surfaces 86a, 86b, 86c and 86d are Ia, Ib, Ic and Id, respectively, by effecting an operation $$(Ib+Ic)-(Ia+Id)$$

in an electric system as shown in FIG. 12A, a focus error signal as shown in FIG. 12B is obtained at the output terminal 118 of a differential amplifier 117. In FIG. 12B, the abscissa represents the distance between the objective lens and the recording surface (the focus error) when the in-focus position is zero, and the ordinate represents the signal output. In accordance with the obtained focus error signal, the objective lens 78 or the entire optical head is moved relative to the disc along the optic axis of the incident light through an actuator, not shown, whereby auto-focus becomes possible.

Figure 13A:
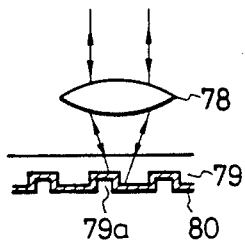
FIGS. 13A, 13B and 13C show the positional fluctuations of a light spot on a recording surface.
Figure 13B:
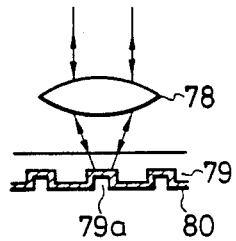
Figure 13C:
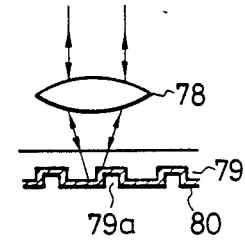
Figure 14A:
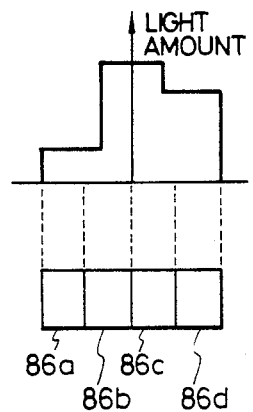
FIGS. 14A, 14B and 14C show the variations in the light amount on the photodetector.
Figure 14B:
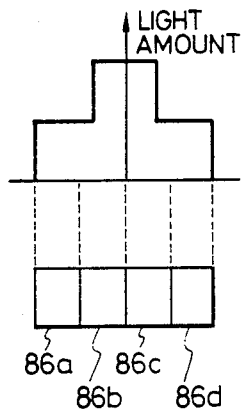
Figure 14C:
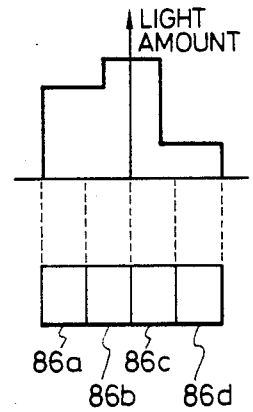
Figure 15A:
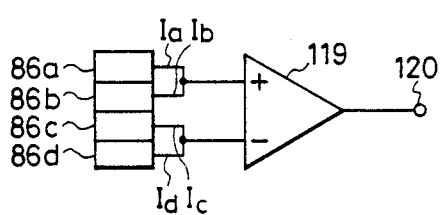
FIGS. 15A and 15B show a tracking error detecting electric system and a tracking error signal, respectively.
Figure 15B:
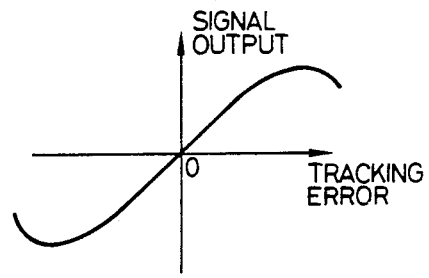

The principle of auto-tracking in the embodiment shown in FIG. 9 will now be described. Assuming that a groove 79a is formed in the substrate 79 of an information carrier as shown in FIGS. 13A, 13B and 13C, the incident light beam is condensed near this groove 79a by the objective lens 78. FIG. 13B shows a state in which a spot is created on the groove, and FIGS. 13A and 13C show a state in which a spot is created at the right or left relative to the groove. The light beam reflected by the recording surface 80 of the substrate 79 includes the tracking information by the diffraction or the scattering on the groove 79a. When the above-mentioned reflected light is received by the photodetector 86 shown in FIG. 9, the light amounts received by the light-receiving surfaces 86a, 86b, 86c and 86d vary as shown in FIGS. 14A, 14B and 14C in conformity with the states of FIGS. 13A, 13B and 13C. Accordingly, by an operation $$(Ia+Ib)-(Ic+Id)$$

being effected in an electric system as shown in FIG. 15A, a tracking error signal as shown in FIG. 15B is obtained at the output terminal 120 of a differential amplifier 119. In FIG. 15B, the abscissa represents the tracking error and the ordinate represents the signal output. Auto-tracking becomes possible by a method of driving a tracking actuator, not shown, in accordance with the obtained tracking error signal and moving the objective lens perpendicularly to the optic axis. Description has been made of a case where a groove as a guide track is pre-formed in the substrate 79, but when the information recorded on the recording surface 80 is to be detected, even if such a groove is absent, unbalance occurs to the light amount distribution on the photodetector 86 in comformity with the positional relation between the recorded signal row (recording track) and the spot. Accordingly, even in such a case, a tracking signal is likewise obtained by operating the output of each light-receiving surface of the photodetector 86 as shown in FIG. 15A.

As can be seen from the above-described embodiment, in the present invention, the beam splitter itself has a lens action and therefore, a sensor lens or the like is unnecessary and the optical head device can be constructed compactly. Also, optical adjustment may be effected only between the beam splitter and the photodetector and thus becomes very simple.

Figure 16:
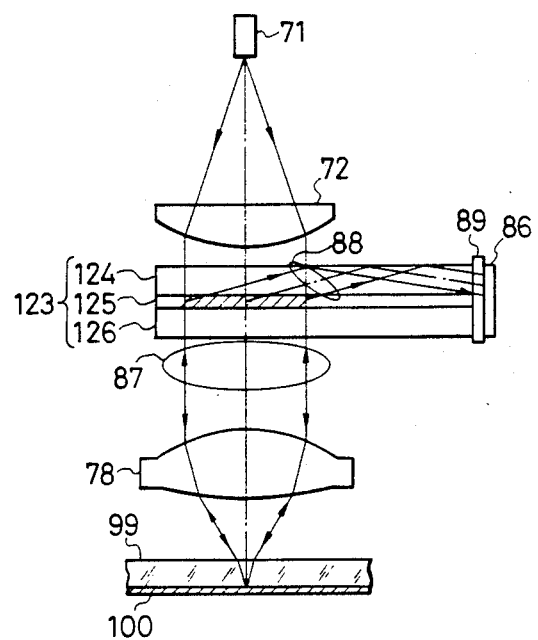
FIG. 16 is a schematic view showing the construction of a fifth embodiment of the present invention.

FIG. 16 schematically shows the construction of a fifth embodiment in which the construction of the fourth embodiment is applied to the reading of an opto-magnetic recording medium. In FIG. 16, p-polarized light emitted from a semiconductor laser 71 is made into a parallel light beam by a collimator lens 72 and enters a beam splitter 123 comprised of parallel flat plates 124 and 126 and a diffraction grating 125. The linearly polarized light (P-polarized light) transmitted through the beam splitter 123 is condensed into a spot of a diameter of about 1 μm on the recording surface 100 of a substrate 99 by an objective lens 78. The reflected light 87 whose plane of polarization has been rotated (by Kerr-rotation) in accordance with the information on the recording surface 100 on which the information is magnetically recorded again enters the beam splitter 123 and is diffracted at a predetermined angle of diffraction by the diffraction grating 125. This diffracted light 88 is increased in its apparent Kerr rotation angle as in the second embodiment and is waveguided while repeating total reflection on the surface of the parallel flat plate 124 or 126, and enters a four-division photodetector 86 provided on the end surface of the beam splitter 123. An analyzer 89 is provided just in front of the photodetector 86 to convert an opto-magnetic signal into a light amount variation.

Figure 17:
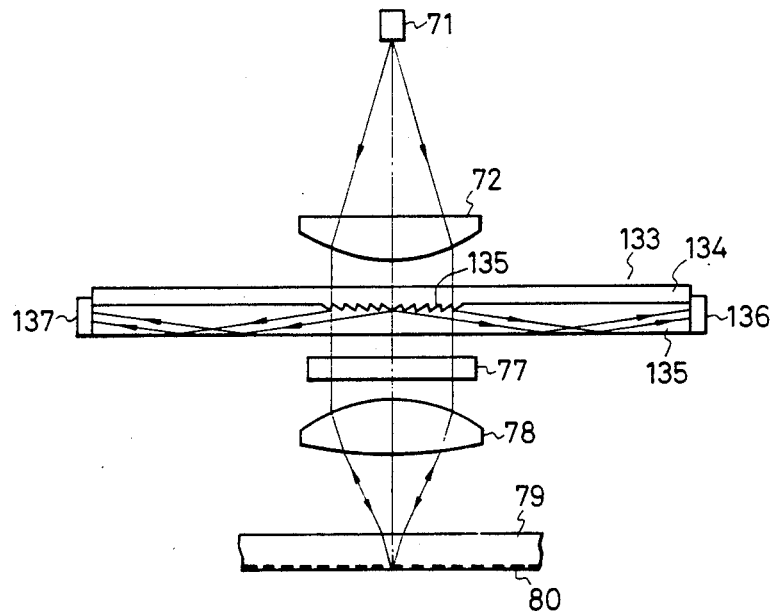
FIG. 17 is a schematic view showing the construction of a sixth embodiment of the present invention.

FIG. 17 schematically shows the construction of a sixth embodiment of the optical head device according to the present invention. In FIG. 17, members identical to those in the previous embodiment are given identical reference numerals. The light beam from a semiconductor laser 71 is made into a parallel flat light beam by a collimator lens 72 and enters a beam splitter 133 comprising substrates 134 and 136 comprising parallel flat plates and a diffraction grating 135 formed therein. This beam splitter 133 performs no function on the incident light beam and therefore, the light beam is intactly transmitted therethrough and enters a quarter-wavelength plate 77 and becomes a circularly polarized light, whereafter it is condensed on an information recording surface 80 by an objective lens 78 through a substrate 79. The light beam reflected by the information recording surface 80 passes through the objective lens 78 and becomes a parallel light beam, and is again transmitted through the quarter-wavelength plate 77 and becomes a polarized light beam which vibrates in a direction orthogonal to the direction during the incidence, and enters the beam splitter 133. This reflected light is diffracted by the diffraction grating 135 in the beam splitter 133 and is waveguided through the substrate 136 while repeating total reflection, and enters photodetectors 136 and 137. When information is to be recorded, the semiconductor laser 71 is driven in accordance with an information signal and the light incident on the information recording surface is modulated, thereby effecting the information recording. When information is to be detected, an unmodulated light is applied to the information recording surface 80 and the reflected light subjected to modulation in accordance with the information recorded thereon is detected by the photodetectors 136 and 137, whereby the information is reproduced.

FIG. 18 is a view of the beam splitter 133 of FIG. 17 as seen from the direction of the semiconductor laser 71. The diffraction grating 135 constituting the dividing surface of the beam splitter 133 is divided into two areas with a segment AA' as the boundary, and two frame gratings 135a and 135b formed with different grating patterns diffract the reflected light from the information recording surface 80 in different directions and direct the diffracted lights to different photodetectors 137 and 136. By suitably processing the output signals of these photodetectors 136 and 137, there are obtained a focus error signal, a tracking error signal and an information reproducing signal which are necessary for the optical head device.

The principle of detecting the focus error signal will first be described. The aforementioned photodetector 136 has its light-receiving surface divided into three parts as shown in FIGS. 19A–C. Let it be assumed that the photodetectors are disposed so that a light amount distribution as shown by hatching in FIG. 19B is provided when a minimum light spot is created on the information recording surface 80 (that is, the in-focus state). If, at this time, the distance between the information recording surface 80 and the objective lens 78 is too great (that is, the out-of-focus state is provided), the expanse of the light beam in the direction of arrangement of the light-receiving surfaces is reduced as shown in FIG. 19A and, if conversely the distance between the information recording surface 80 and the objective lens 78 becomes too small and the out-of-focus state is provided, the light amount distribution widens as shown in FIG. 19C. Accordingly, by operating the outputs $I_A$, $I_B$ and $I_C$ of the light-receiving surfaces 136A, 136B and 136C, respectively, of the photodetector 136 by means of an operator 138 as follows, there is obtained the focus error signal $I_F$:

$$I_F = (I_A + I_B) - I_C$$

Detection of the tracking error signal will now be described. The dividing surface of the beam splitter is divided into two areas by the segment AA' as previously mentioned, and the direction of this segment AA' is coincident with the direction of extension of a track comprising signal rows recorded on the information recording surface 80 or a guide track provided in advance on the substrate 79 or the like. Accordingly, the lights received by the photodetectors 136 and 137 include the information from the right side and the left side, respectively, of the track and, by differentiating the outputs of these photodetectors 136 and 137 by means of an operator 139, a so-called push-pull type tracking error signal $I_T$ can be detected. The tracking error signal $I_T$ is expressed as the following equation with the output of the photodetector 137 as $I_D$:

$$I_T = (I_A + I_B + I_C) - I_D$$

Also, if the sum $$I_{RF} = (I_A + I_B + I_C) + I_D$$

of the signal outputs of the photodetectors 136 and 137 is calculated by an operator 140, this becomes the information reproducing signal $I_{RF}$. The photodetector 137 used here may be an element of the same kind as the photodetector 136 or an element whose light-receiving surface is not divided. Where an element whose light-receiving surface is divided into three parts is employed as the photodetector 137, if the outputs from the respective light-receiving surfaces are $I_{D1}$, $I_{D2}$ and $I_{D3}$, by effecting an operation $$I'_T = (I_{D1} + I_C) - (I_{D3} + I_A),$$

it is also possible to obtain the tracking error signal $I'_T$ by the heterodyne method.

In the present embodiment, the beam splitter is formed into a parallel flat plate type and therefore, the entire optical head device can be made thin. Also, by working a plurality of such beam splitters in a lump on a large substrate and cutting them out, the beam splitter itself can be simply made, and this is excellent in mass productivity. In addition, in the present embodiment, the light reflected from the information recording surface is divided by the dividing surface of the beam splitter and the respective light beams are detected by discrete photodetectors and therefore, the mounting accuracy of the photodetector for the detection of the tracking error signal is alleviated and the assembly and adjustment is easy. Further, where the photodetectors are integrally formed on the end surfaces of the substrate of the beam splitter, such assembly and adjustment is unnecessary. Also, to obtain a good tracking error signal, it is generally well known that it is desirable to detect the intensity distribution on the pupil plane of the objective lens, and in the present embodiment, the intensity distribution on the dividing surface of the beam splitter placed near the objective lens is detected, and this means that actually the detection by the division of the pupil plane is effected and thus, highly reliable tracking control can be accomplished.

Description will hereinafter be made of another example of the construction of the beam splitter whose dividing surface has a plurality of areas for directing the reflected light from the recording medium to different photodetectors as in the sixth embodiment.

Figure 20A:
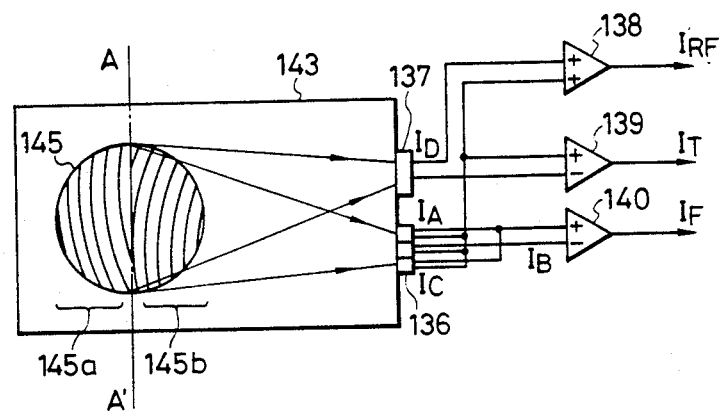
FIGS. 20A, 20B, and 21 through 24 are schematic plan views showing modifications of the beam splitter in the sixth embodiment.

The beam splitter 143 of FIG. 20A is designed such that the two diffracted light beams directed to the discrete end surfaces of the beam splitter in the sixth embodiment are detected on the same end surface. In FIG. 20A, members identical to those in FIG. 18 are given identical reference numerals and need not be described in detail. A diffraction grating 145 constituting the dividing surface of the beam splitter 143 is divided into two areas of different grating patterns with the segment AA' corresponding to the direction of extension of the track on the information recording surface as the boundary. Respective frame gratings 145a and 145b diffract the reflected light from the information recording surface at different positions on one end surface of the beam splitter 143 while converging such reflected light, and direct the diffracted ligths to photodetectors 137 and 136, respectively. By processing the output signals of these photodetectors just in the same manner as described in connection with FIGS. 18 and 19A–C, there are obtained the focus error signal $I_F$, the tracking error signal $I_T$ and the information reproducing signal $I_{RF}$. This construction permits the photodetectors to be arranged concentratedly on one side of the beam splitter and therefore has an advantage over the sixth embodiment that the optical head device can be constructed further compactly.

Figure 20B:
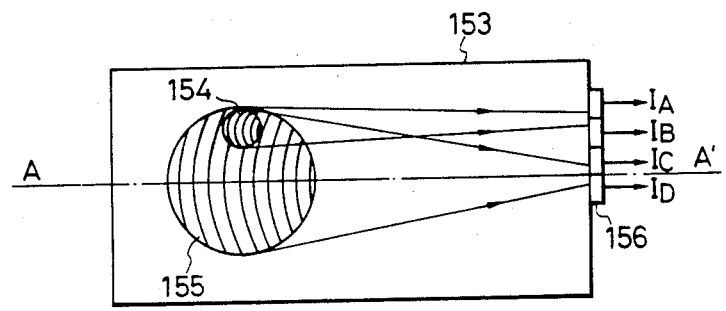

FIG. 20B shows still another example of the construction of the beam splitter. A diffraction grating formed in the beam splitter 153 is made in the same manner as in the previously described embodiment and is divided into frame gratings 154 and 155. Each of the frame gratings 154 and 155 is formed with a lens action so that the diffracted light forms a focal line in a predetermined direction, and directs each diffracted light to a four-division photodetector 156 formed on one end surface of the beam splitter. The direction of the focal line of the frame grating 154 is coincident with the direction AA' of the track image of the information recording surface. The outputs $I_A$, $I_B$, $I_C$ and $I_D$ from the divided light-receiving surfaces of the four-division photodetector 156 can be suitably processed by an operator, not shown, thereby obtaining various signals necessary for the optical head device. For example, the information reproducing signal $I_{RF}$ is obtained from the sum $$I_{RF}=I_A+I_B+I_C+I_D$$

of said outputs. Also, the focus error signal $I_F$ is obtained by the detection of the run-out and expanse in the plane of the drawing sheet of FIGS. 20A–C of the light beam divided substantially at the pupil plane position of the objective lens by the frame grating 154. The position of the frame grating 154 and the direction of diffraction of the light diffracted thereby can be provided arbitrarily as previously described and the photodetector 156 may be disposed anywhere, but the focusing error signal $I_F$ can be detected with good sensitivity by disposing the photodetector 156 so that, as shown in FIG. 20, the variation in the diffracted light is great in the direction of division of the light-receiving surfaces of the photodetector 156. More specifically, the focusing error signal IF is obtained as $$I_F=I_A-I_B$$

with the difference between the outputs $I_A$ and $I_B$ of the light-receiving surfaces being taken. The tracking error signal $I_T$ is obtained from the light amount distribution in the reflected light beam from the information recording surface and therefore is obtained from the difference in light amount between the light beams divided by the focal line of the frame grating 155 which is coincident with the direction AA' of the track image. Actually, by operating the outputs from the respective light-receiving surfaces of the four-division photodetector 156, $I_T$ is obtained as $$I_T=I_A+I_B+I_C-I_D.$$

By the light beam control signals (the focus error signal and the tracking error signal) obtained in the above-described manner, the optical head device is controlled so that a desired light beam enters the information recording surface, whereby detection or recording of the information can be reliably accomplished. In the beam splitter shown in FIGS. 20A–C, the construction of the diffraction grating can be set arbitrarily as previously described and therefore, although not particularly shown, the four-division photodetector may be replaced by a combination of two-division photodetectors or a combination of a two-division photodetector and a photodetector whose light-receiving surface is not divided. Also, of course, the position of the frame grating 154 can be set at any position in the surface of the grating.

Figure 21:
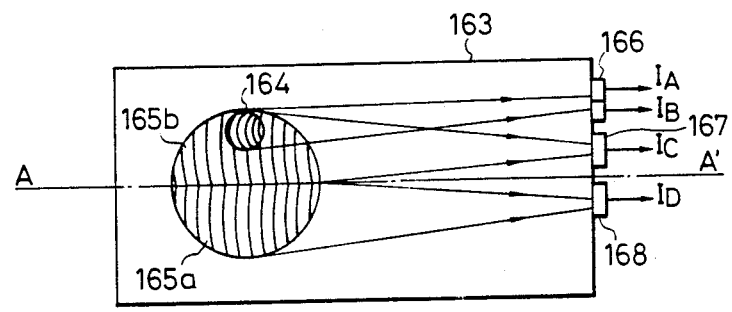

FIG. 21 shows still another example of the construction of the beam splitter. In this beam splitter 91, as in FIG. 20, a frame grating 164 for the detection of the focus error signal is provided within the diffraction grating and in addition, the other portion is further divided by a dividing line coincident with the direction AA' of the track image and frame gratings 165a and 165b are formed respectively. The light diffracted by the frame grating 164 is directed to a two-division photodetector 166. Also, the two light beams diffracted by the frame gratings 165a and 165b are waveguided through the beam splitter in the directions of the focal lines by the respective gratings and are directed to corresponding photodetectors 167 and 168, respectively. By processing the outputs $I_A$ and $I_B$ of the respective light-receiving surfaces of the two-division photodetector 166, the output $I_C$ of the photodetector 167 and the output $I_D$ of the photodetector 168 by means of an operator, not shown, just in the same manner as described with respect to the beam splitters of FIGS. 20A–C, there are obtained a focus error signal, a tracking error signal and an information reproducing signal. In this beam splitter, the light from the information recording surface is divided by the frame gratings 165a and 165b on the dividing line coincident with the direction of the track image and the divided lights are directed to the different photodetectors and thus, the light amount distribution of the light beam including the position information of the track is divided and detected substantially at the pupil plane position of the objective lens, and more reliable detection of the tracking error signal is possible.

Figure 22:
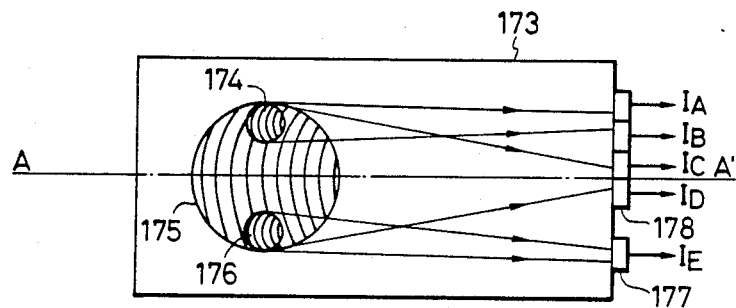

The diffraction grating on the beam splitter 173 of FIG. 22 is divided into frame gratings 175, 174 and 176, and is just in a form in which the frame grating 176 is added to the construction of FIGS. 20A–C. The light beams diffracted or reflected by the frame gratings 175 and 174 are detected by a four-division photodetector 178, and the light beam diffracted or reflected by the frame grating 176 is detected by a photodetector 177. The present embodiment can thus compensate for the symmetry of the light beam in the diffraction grating with the direction AA' of the track image as the symmetry axis, thereby simplifying the operation process of the signals from the photodetectors. Specifically, when the outputs from the divided light-receiving surfaces of the four-division photodetector 178 are $I_A$, $I_B$, $I_C$ and $I_D$, respectively, and the output of the photodetector 177 is $I_E$, the information reproducing signal $I_{RF}$ is obtained as $$I_{RF}=I_A+I_B+I_C+I_D+I_E.$$

Also, the focus error signal $I_F$ is obtained as the difference between $I_A$ and $I_B$, i.e., $$I_F=I_A-I_B.$$

The tracking error signal $I_T$ is obtained simply as the difference between the output signals $I_C$ and $I_D$ of the photodetector 178 because of the addition of the frame grating 176.

$$I_T=I_C-I_D$$

It is also possible to eliminate the photodetector 177 and obtain the information reproducing signal $I_{RF}$ as $$I_{RF}=I_A+I_B+I_C+I_D.$$

In this case, the light beam diffracted by the frame grating 176 may sometimes be reflected or scattered on the end surface of the photodetector 173 resulting in stray light, and therefore, a light absorbing member may be installed at the position from which the photodetector 177 has been eliminated. Again in this beam splitter, a modification such as the substitution of the photodetectors as described in connection with FIGS. 20A-C is likewise possible.

Figure 23:
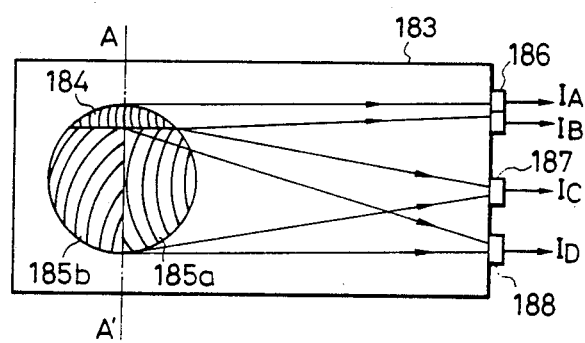

The diffraction grating on the beam splitter 183 of FIG. 23 is divided into frame gratings 185a, 186b and 184, and the respective frame gratings diffract a light beam while converging it so as to form focal lines in different directions. The light beam from the frame grating 184 is waveguided through the beam splitter and is detected by a two-division photodetector 186. Also, the dividing line between the frame gratings 185a and 185b is conicident with the direction AA' of the track image, and the respective diffracted lights are detected by photodetectors 187 and 188. When the outputs of the light-receiving surfaces of the two-division photodetector 186 are $I_A$ and $I_B$ and the output of the photodetector 187 is $I_C$ and the output of the photodetector 188 is $I_D$, the information reproducing signal $I_{RF}$ is obtained from the sum $$I_{RF}=I_A+I_B+I_C+I_D$$

of these outputs. Also, the focus error signal $I_F$ is obtained by the detection of the run-out and expanse on the light-receiving surface of the photodetector 186 of the light beam divided substantially at the pupil plane position of the objective lens by the frame grating 183. The positions of the frame gratings and the direction of diffraction can be made arbitrarily as described in connection with FIG. 20, and optimum designing capable of high sensitivity detection is made. Specifically, the focus error signal $I_F$ is obtained as $$I_F=I_A-I_B$$

by taking the difference between the two output signals of the two-division photodetector. The tracking error signal $I_T$ is obtained by detecting the light amounts from the frame gratings 185a and 185b divided with the direction AA' of the track image as the boundary by means of corresponding photodetectors 188 and 187, and taking the difference between the output signals thereof.

$$I_T=I_C-I_D$$

In the present embodiment, the photodetectors 187 and 188 can be replaced by a two-division photodetector and it is also free to replace the photodetectors 186, 187 and 188 by a four-division photodetector.

Figure 24:
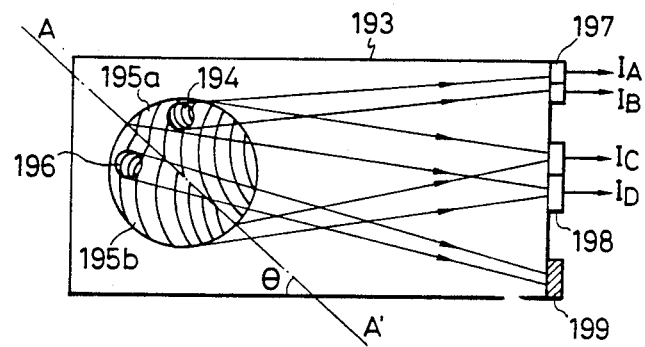

In the beam splitter of FIG. 24, there is shown a case where the direction AA' of the track image forms an arbitrary angle $\theta$ with respect to the beam splitter 193. The diffraction grating of the beam splitter 193 is divided into frame gratings 195a, 195b, 194 and 196, each of which diffracts or reflects a light beam while converging it so as to form focal lines in different directions. The line which divides the frame gratings 195a and 195b is coincident with the direction AA' of the track image, and the frame gratings 194 and 196 are made at line-symmetrical positions with this dividing line as the symmetry axis. The light beams diffracted by the frame gratings 195a and 195b are directed to the respective light-receiving surfaces of a two-division photodetector 198. The light beam from the frame grating 194 is detected by a two-division photodetector 197. Also, the light beam from the frame grating 196 is absorbed by a light absorbing member 199. When the outputs of the light-receiving surfaces of the two-division photodetector 197 are $I_A$ and $I_B$ and the outputs of the light-receiving surfaces of the two-division photodetector 198 are $I_C$ and $I_D$, the information reproducing signal $I_{RF}$, the focus error signal $I_F$ and the tracking error signal $I_T$ are obtained by operating and processing said outputs by means of an operator, not shown, just in the same manner as in the case of FIGS. 20A-C.

In the present embodiment, the frame grating 196 is provided to compensate for the symmetry of the two light beams divided by the frame gratings 195a and 195b during the detection of the tracking error signal, and performs the same function as the frame grating 176 of FIG. 22. Accordingly, the light absorbing member 199 may be replaced by a photodetector so that the information reproducing signal and the light beam control signal may be obtained in a process similar to that in the example shown in FIG. 22. Also, in the present embodiment, a construction is conceivable in which the frame grating 196 is eliminated and said compensation is effected by the operation process of the photodetector as in the example shown in FIG. 21.

While various examples of the construction of the beam splitter have been shown above, the present invention also permits a modification such as a construction which employs still another beam splitter or a construction in which the construction of the other members than the beam splitter is made different. For example, where opto-magnetic record is to be read, in the construction shown in FIG. 17, the quarter-wavelength plate 77 may be eliminated and a polarizing plate may be disposed just in front of the photodetectors 136 and 137 or the quarter wavelength plate 77 may be replaced by a Faraday element, whereby detection may become possible.

Description will now be made of the structure of the diffraction grating constituting the previously described beam splitter and a method of making the diffraction grating.

Figure 25:
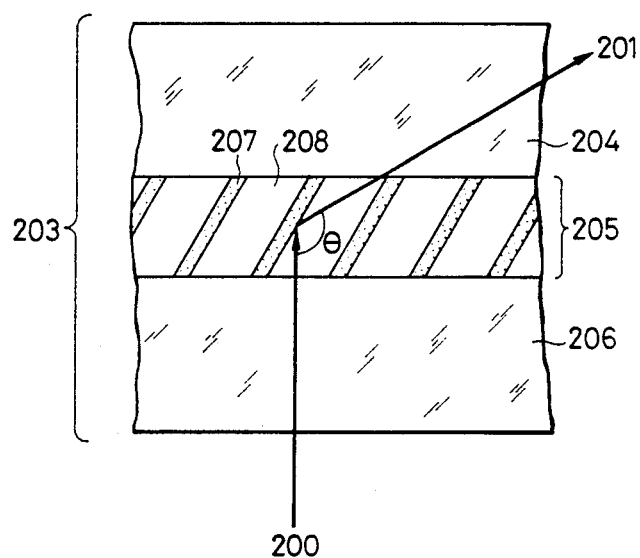
FIG. 25 is a fragmentary enlarged cross-sectional view of a beam splitter using a volume type diffraction grating.

FIG. 25 is a fragmentary enlarged cross-sectional view of a beam splitter using a volume type diffraction grating. The beam splitter 203 comprises parallel flat plates 204 and 206 and a volume type diffraction grating 205 sandwiched therebetween. The volume type diffraction grating 205 is comprised of a layer 207 of high refractive index and a layer 208 of low refractive index. The incident light 200 from the recording surface is diffracted by the diffraction grating 205 and becomes a diffracted light 201. Where the diffraction grating 205 substantially satisfies the Bragg condition relative to the incident light 200, most energy of the diffracted light 201 concentrates in a predetermined direction as indicated by the angle of diffraction $\theta$. Also, the diffraction efficiency of P-polarized light and S-polarized light is varied by the setting of this angle of diffraction $\theta$. Accordingly, where, as in the second embodiment, such a beam splitter is used for the reading of the information on a magnetic recording medium, improvement of the reproduction S/N can be achieved by the utilization of said polarizing characteristic.

Figure 26:
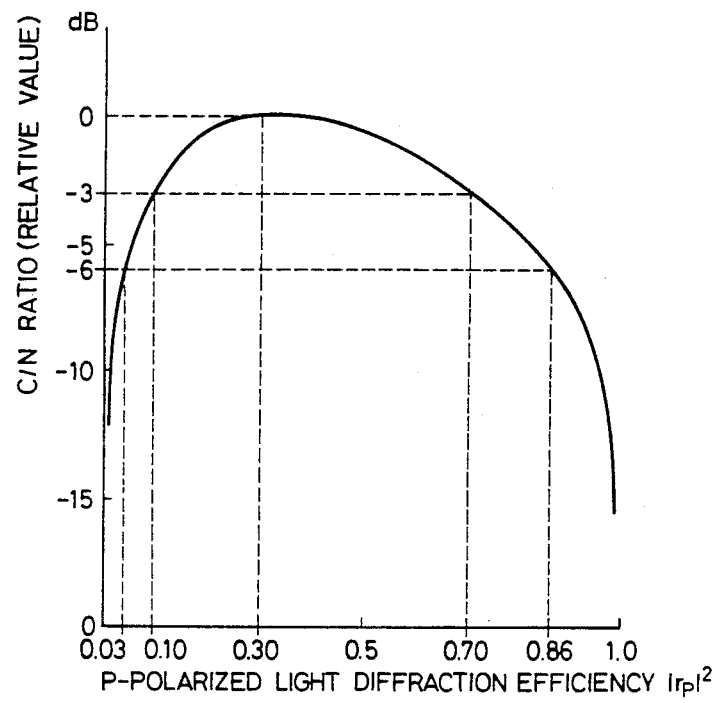
FIG. 26 is a graph showing the relation between the P-polarized light diffraction efficiency of the diffraction grating and the C/N ratio.

Let it be assumed that a light having entered the recording surface of an opto-magnetic recording medium while being P-polarized light and reflected by being subjected to Kerr rotation is diffracted by the volume type diffraction grating and detected. The Kerr rotation component then created by the magnetic Kerr effect of the recording surface is S component and therefore, the S/N ratio of the detected signal is improved when the diffraction efficiency of the volume type diffraction grating for S-polarized light is higher. Also, the apparent Kerr rotation angle is varied by the ratio between the diffracted P-polarized light and S-polarized light. Thus, with the diffraction efficiency $|r_s|^2$ of the volume type diffraction grating for S-polarized light being 100% and by variously varying the diffraction efficiency $|r_p|^2$ for P-polarized light, the C/N ratio (the S/N ratio at the frequency of the carrier wave signal) of the detected opto-magnetic signal has been found. The result is shown in FIG. 26. In FIG. 26, the abscissa represents the diffraction efficiency for P-polarized light and the ordinate represents the C/N ratio of the detection signal in dB (decibel) at a relative value to the peak. To obtain a detection signal suitable for the reading of information, the reduction in the C/N ratio must be suppressed within $-6$ dB from the maximum value, and the allowable range of $|r_p|^2$ is from 0.03 to 0.86.

On the other hand, the ratio of diffraction efficiency between the P-polarized light and the S-polarized light in the volume type diffraction grating is approximately represented by $\cos^2\theta$ by the use of the angle of diffraction $\theta$. When $\theta=80°$ or $\theta=100°$, $\cos^2\theta=0.03$, and when $\theta=22°$ or $\theta=158°$, $\cos^2\theta=0.86$. Accordingly, from the result shown in FIG. 26, the angle of diffraction of the volume type diffraction grating used as a beam splitter in the reading of magnetical information must be in the range of 22° to 100° or 100° to 158°.

Also, in the foregoing, the angle of diffraction has been found from the tolerance of the optomagnetic reading, but in order that the information signal may be well detected, it is desirable in FIG. 26 that the reduction in the C/N ratio be within $-3$ dB. The then P-polarized light diffraction efficiency is 0.30–0.70 and as previously described, $\theta=72°$, 108° is found from $\cos^2\theta=0.30$ and $\theta=33°$, 147° is found from $\cos^2\theta=0.7$. Accordingly, it is further desirable that a volume type diffraction grating having an angle of diffraction of 33° to 72° or 108° to 147° be used for the reading of magnetical information.

Figure 27:
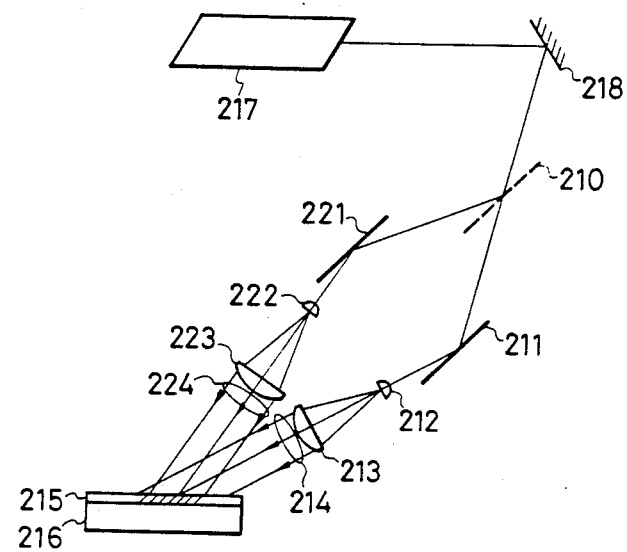
FIG. 27 is a schematic view showing an example of the method of making the diffraction grating shown in FIG. 25.

FIG. 27 shows an example of the method of making the volume type diffraction grating used in the present invention. A light beam emitted from a laser light source 217 is reflected by a mirror 218, and thereafter is divided by a beam splitter 210. The two light beams thus divided have their beam diameters expanded by beam expander systems comprising microscope objective lenses 212, 222 and collimator lenses 213, 223 through mirrors 211, 221 and become parallel light beams 214 and 224. These parallel light beams 214 and 224 enter a volume type hologram sensing material 215 applied onto a substrate 216, at different angles, and interfere with each other to form three-dimensional interference fringes. The interference fringes exposed to the volume type hologram sensing material 215 in this manner are recorded in the form of a variation in refractive index by a developing process and form a volume type diffraction grating. The hologram sensing material used may be any material such as bichromate gelatine.

Figure 28A:
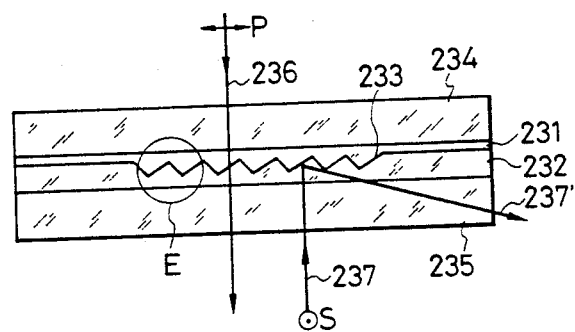
FIGS. 28A and 28B are schematic cross-sectional views showing a beam splitter using a relief type diffraction grating.
Figure 28B:
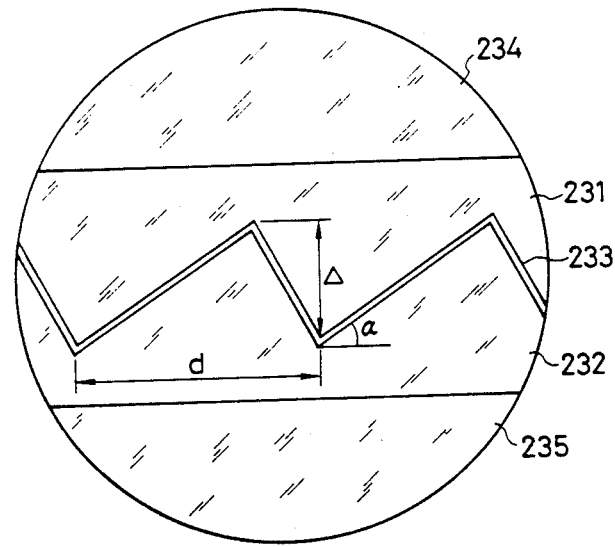

FIGS. 28A and 28B show a beam splitter using a relief type diffraction grating, FIG. 28A schematically showing the construction thereof and FIG. 28B showing a portion E of the diffraction grating in FIG. 28A on an enlarged scale. At least one of transparent members 231 and 232 having the same refractive index has a plurality of inclined surfaces, and a reflecting film 233 of polarized light dependency is provided on the boundary surface between these inclined surfaces and forms a relief type diffraction grating. Further, the transparent members 231 and 232 are supported between parallel flat plates 234 and 235, which are not always necessary. The reflecting film 233 is designed to exhibit transmittance of approximately 100% for P-polarized light and exhibit a reflectance of approximately 100% for S-polarized light. Accordingly, this polarizing beam splitter acts as a mere parallel flat plate which transmits therethrough almost all of the P-polarized incident light 236, and almost all of the S-polarized incident light 237 is diffracted and provides a diffracted light 237'.

Figure 1:
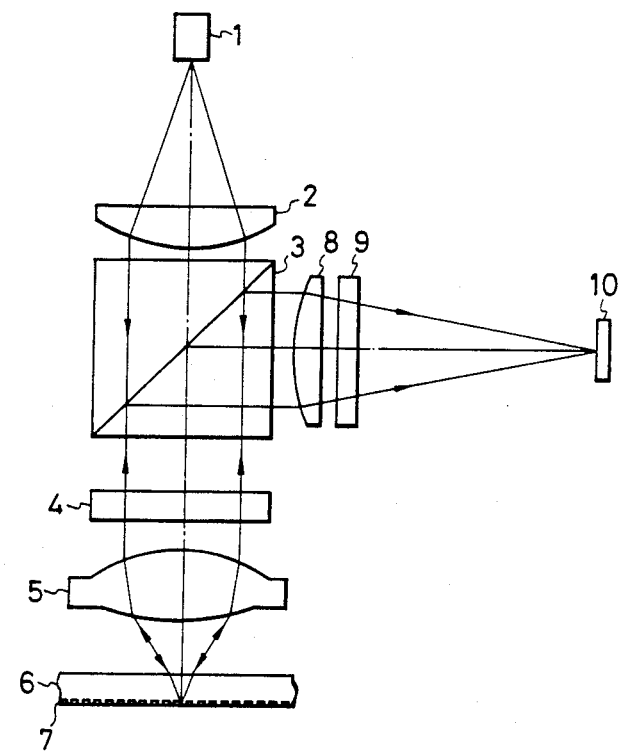
FIG. 1 is a schematic view showing the construction of an optical head device according to the prior art.
Figure 2:
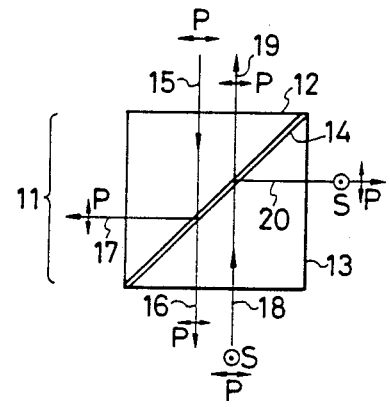
FIG. 2 is a schematic view showing the construction of the polarizing beam splitter shown in FIG. 1.
Figure 3:
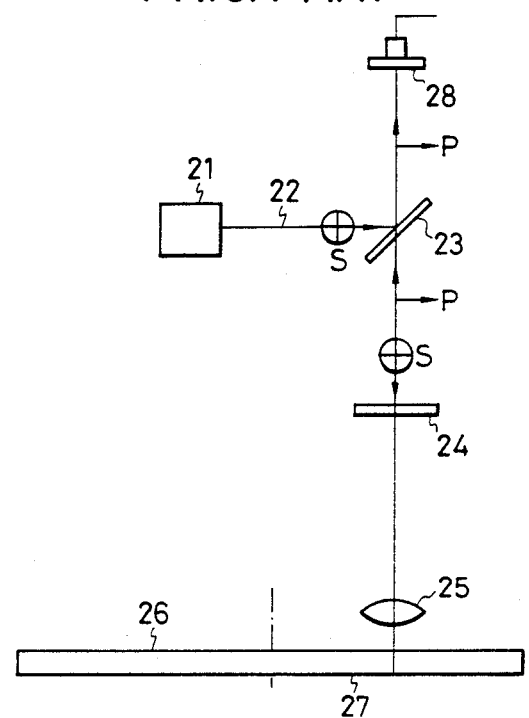
FIGS. 3 to 5 are schematic views showing further examples of the construction of the optical head device according to the prior art.
Figure 5:
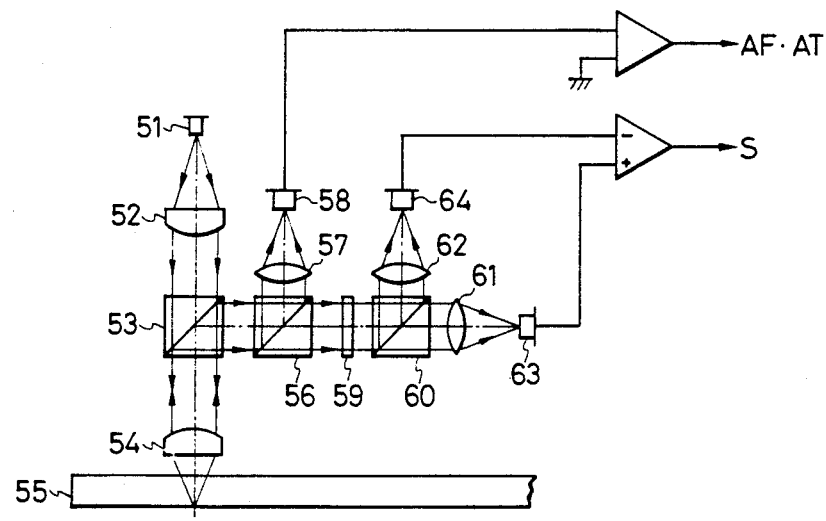
Figure 4:
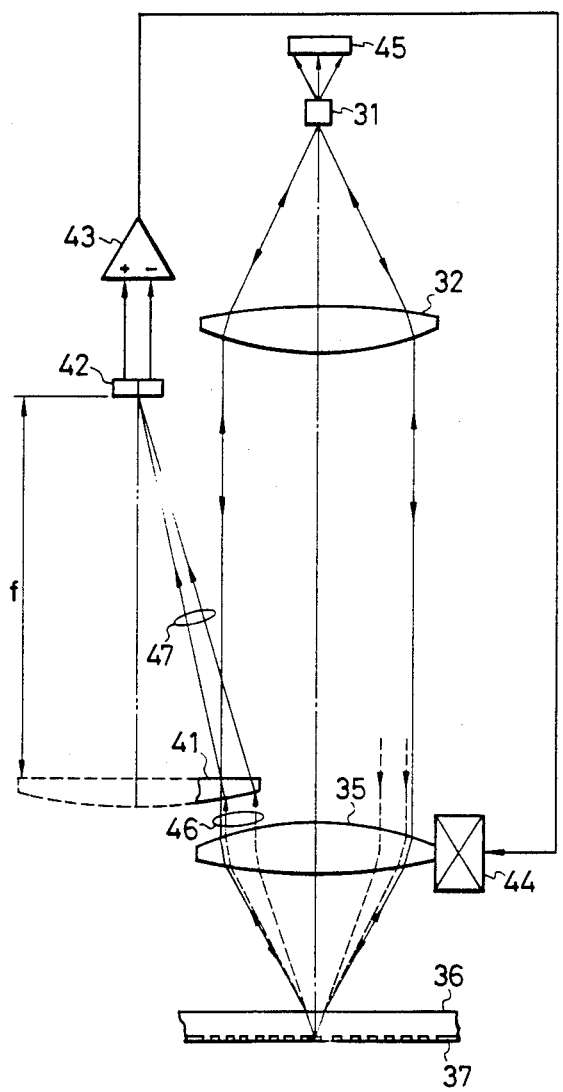

In FIG. 28B, the relief type diffraction grating is made into a triangular shape having a pitch $d=20$ μm, a depth $\Delta=10$ μm and an angle of inclination $\alpha=40°$. In the case of this example, the energy of the diffracted light almost concentrates in the direction of the regular reflection by the reflecting film 233. Also, the rate of the diffracted light and the non-diffracted light is substantially determined by the characteristic of the reflecting film 233. Accordingly, by forming the reflecting film 233 like the prior art reflecting film 14 shown in FIG. 2, a beam splitter having an optimum polarizing characteristic for the reading of opto-magnetic record can be obtained again in the construction of the present invention.

The diffraction grating as previously described can be simply made by a method of exposing to a relief type photosensitive material such as photoresist an interference fringe obtained by superposing light beams divided from the same laser light source one upon another, and developing the same or mechanically directly cutting a substrate comprising a transparent member. Also, such diffraction grating can be made with good productivity and inexpensively by working a matrix by cutting and transferring a grating pattern to a transparent member such as plastic by a method such as injection, compression or thin layer copying. In this case, said plurality of inclined surfaces are formed on one transparent member and a reflecting film is provided thereon, whereafter it is made up for by the other transparent member. Also, a plurality of inclined surfaces having concavity and convexity corresponding to each other may be formed on both transparent members and a reflecting film may be formed thereon, whereafter these may be joined together to provide a polarizing beam splitter.

Also, the reflecting film of polarized light dependency as previously described can be obtained by evaporating a dielectric multi-layer film on an inclined surface of diffraction grating structure. Such a dielectric multi-layer film is known from the literature (Hiroshi Kubota: *Wave Optics*, p. 236, published by Iwanami Shoten, Feb. 2, 1971), and it exhibits a high reflectance for S-polarized light and a low reflectance for P-polarized light, for example, by alternately evaporating layers formed of a substance of low refractive index and layers formed of a substance of high refractive index. In this case, the thickness d of each layer is determined from nd $\cos\theta=\lambda/4$, where n is the refractive index of the substance forming the layer, $\theta$ is the angle of incidence of light and $\lambda$ is the wavelength used.

Figure 29:
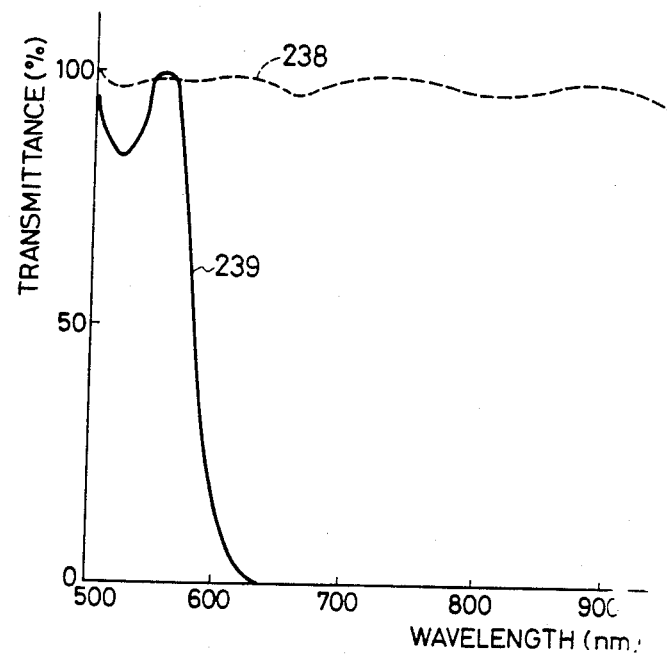
FIG. 29 is a graph showing the wavelength tarnsmission characteristic of a reflecting film formed on the beam splitter shown in FIG. 28.

FIG. 29 shows the wavelength transmission characteristic of the reflecting film formed in the above-described embodiment. Here, four layers of $MgF_2$ of low refractive index (refractive index $n_L=1.38$) and five layers of ZnS of high refractive index (refractive index $n_H=2.30$) were alternately laminated on an inclined surface of diffraction grating structure, whereby a reflecting film comprising nine layers in total was formed. In FIG. 29, broken line 238 indicates the transmittance $|t_P|^2$ for P-polarized light and solid line 239 indicates the transmittance $|t_S|^2$ for S-polarized light. Accordingly, in a long wavelength range in which the wavelength used exists, there is obtained a transmittance approximate to 100% for P-polarized light. Although not shown, as regards the reflectance $|r_S|^2$ for S-polarized light, a value approximate to 100% is obtained in the wavelength range used. On the other hand, where the polarizing beam splitter of the present invention is used for the reading of optomagnetic record, it is necessary that the reflectance $|r_S|^2$ for S-polarized light be 100% and the reflectance $|r_P|^2$ for P-polarized light be a suitable value of the order of 30%, and such a polarizing beam splitter can also likewise be realized by changing the design of the reflecting film.

The diffraction grating used in the aforedescribed third to sixth embodiments diffracts light while causing the light to diverge or converge, and a diffraction grating having such a lens action can be simply obtained as is generally well known in the field of the hologram lens or the like. For example, by forming each inclined surface of the diffraction grating into a conical shape about a predetermined axis, there can be obtained a diffraction grating having a power in a plane containing the direction of arrangement of the grating. Also, if the grating is formed with the pitch thereof being gradually varied, there can be obtained a diffraction grating in which the angle of diffraction differs from location to location and which has a power in a plane containing the incident light and the diffracted light. As a matter of course, these may be combined together and endowed with a two-dimensional lens action.

Figure 30:
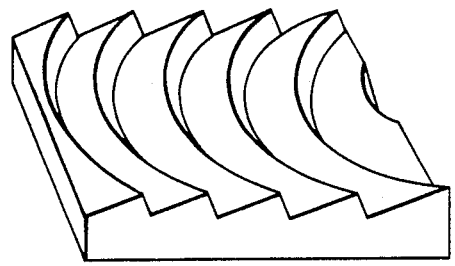
FIG. 30 is a perspective view of a diffraction grating having a lens action.
Figure 31:
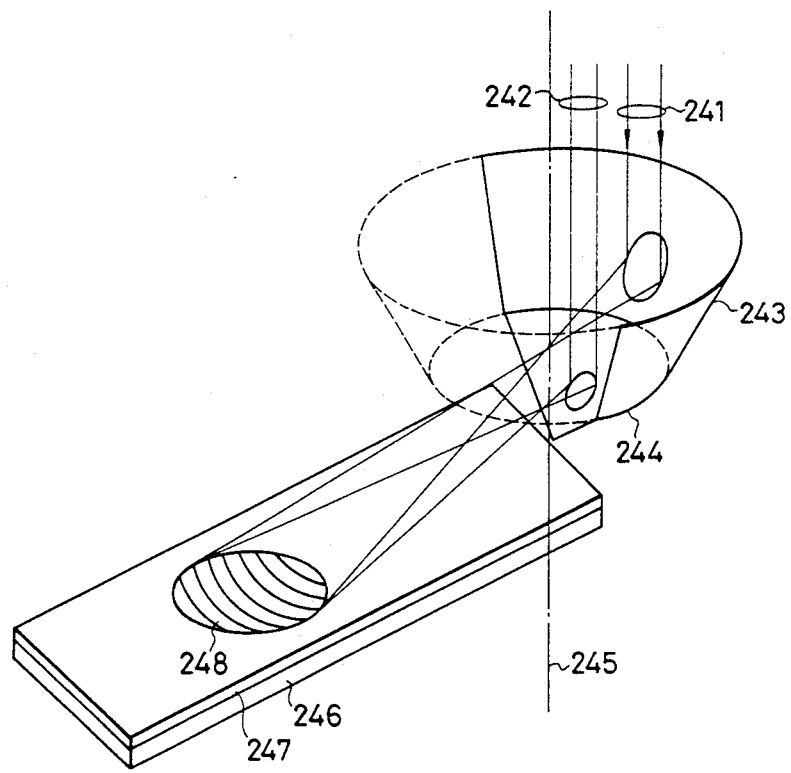
FIG. 31 is a schematic view showing an example of the method of making the diffraction grating shown in FIG. 30.

FIG. 31 illustrates a method of making the diffraction grating as shown in FIG. 30 by the use of optical means. In FIG. 31, parallel light beams 241 and 242 emitted from the same laser light source and divided by an optical system, not shown, enter conical mirrors 243 and 244 sharing a rotary axis 245 in parallelism to the rotary axis 245. The two light beams reflected by the respective conical mirrors become a conical wave surface having a focal line on the rotary axis 245 and enter a hologram sensing material 247 on a substrate 246. The interference fringe then created on an area 248 on the surface of the sensing material assumes a conical shape three-dimensionally having the rotary axis 245 as its center of rotation. Accordingly, by developing the thus exposed interference fringe, there is formed a diffraction grating having the converging action as shown in FIG. 30.

The beam splitter used in the present invention can be simply made by working several such beam splitters in a lump on a large substrate and cutting them out. Also, where the beam splitter is made by the transfer from a matrix as previously described, this is particularly suitable for mass production and can reduce the production cost. Also, the diffraction grating of the present invention can realize the converging or diverging action of variously set diffracted light beams without giving rise to the difficulties in making and therefore can inexpensively obtain an action similar to that of a non-spherical lens. Further, in the beam splitter of the present invention, the incident light enters the inclined surfaces of the diffraction grating at a predetermined angle irrespective of the locations of the inclined surfaces and therefore, the polarizing characteristic does not differ depending on the position of incidence of the light ray as has been experienced in the prior art example in which the joined surfaces of prisms are endowed with curvature.

Figure 32:
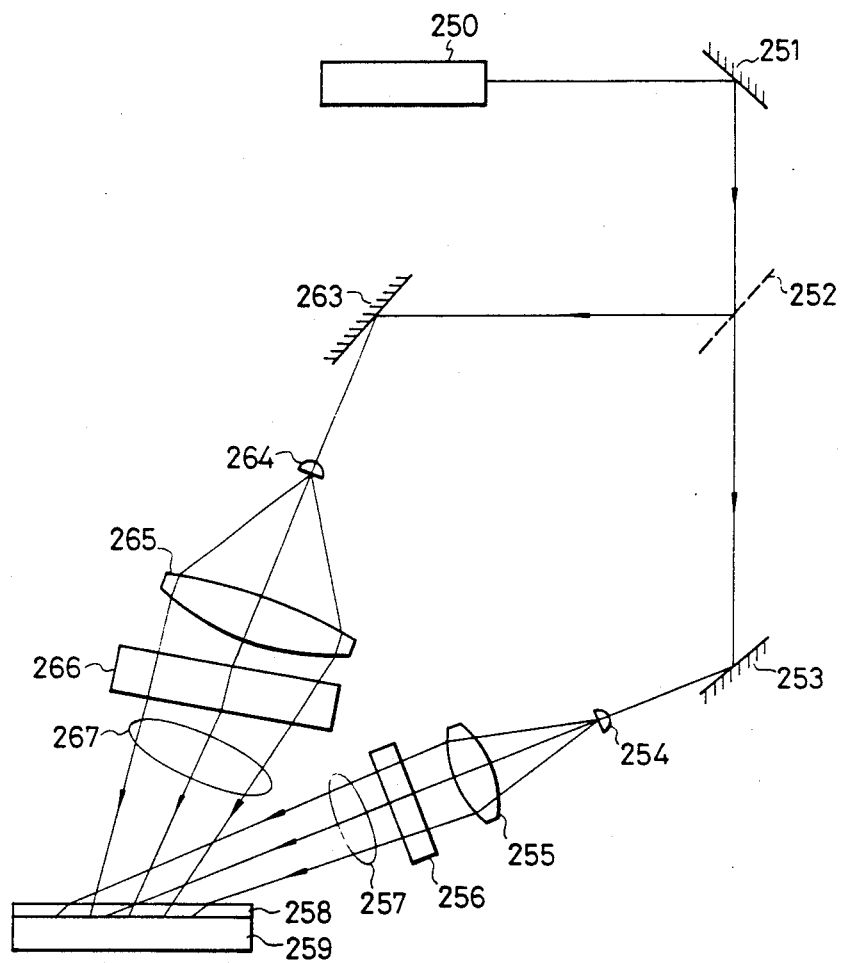
FIG. 32 is a schematic view showing an example of the method of making a diffraction grating used in the embodiment shown in FIG. 8.

Also, the diffraction grating having the concave lens action as used in the third embodiment can be made by the use of an optical system as shown in FIG. 32. A light beam emitted from a laser light source 250 such as an argon laser is reflected by a mirror 251, whereafter it is divided into two light beams by a beam splitter 252. The light beam reflected by the beam splitter 252 is reflected by a mirror 263, whereafter it has its beam width expanded by a microscope objective lens 264 and is made into a convergent light by an imaging lens 265, whereafter it is made into a light beam 267 having necessary spherical aberration and coma by an inclinedly placed parallel flat plate 266, and enters a hologram sensing material 258 on a substrate 259. On the other hand, the light beam transmitted through the beam splitter 252 is reflected by a mirror 253, whereafter it is made into a convergent light beam by a microscope objective lens 254 and an imaging lens 255, and is given astigmatism by a cylindrical lens 256. This light beam 257 enters the hologram sensing material 258 and interferes with said light beam 267, and the interference fringe is exposed to this sensing material. By developing this sensing material, there is obtained the diffraction grating as shown in the third embodiment. The light beams 257 and 267 are given optimum aberrations as described above and therefore, the resultant diffraction grating satisfies the Bragg condition over its entire surface when in use, and exhibits a desired characteristic.

The diffraction grating as previously described can also be made by working a matrix by cutting, and by injection or compression. Such a method will hereinafter be described.

Figure 33:
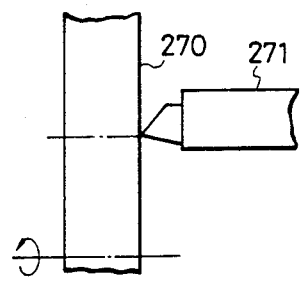
FIGS. 33, 34A, 34B, 35 through 37, 38A and 38B are schematic views illustrating the process of making the matrix of the diffraction grating.
Figure 34A:
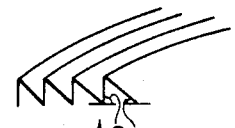
Figure 34B:
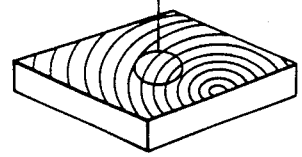

In making a matrix, a mold material 270 is rotated as shown in FIG. 33 and a mold is made while a cutter 271 such as diamond is moved in a direction perpendicular to the plane of the drawing sheet. The vertical angle of the cutting edge of the cutter 271 is determined by angles $\alpha$ and $\beta$, and in the above-described example, it is endowed with an angle of $\sim 65°$. The mold material 270 may be a metal such as photosphor bronze, brass or Ni, or a high molecular material such as solder board or plastic material. However, in the case of a metal mold material, it can be directly used as a stamper, and this leads to an advantage that the step of making a stamper as by electromolding is not necessary. If cutting is effected by the method shown in FIG. 33, there will be obtained a concentric circular relief structure as shown in FIG. 34(B). FIG. 34(A) is an enlarged view of a portion of FIG. 34(B) and in this Figure, $\alpha \approx 35°$, $\beta \approx 80°$ and pitch is $\sim 20$ μm.

Figure 35:
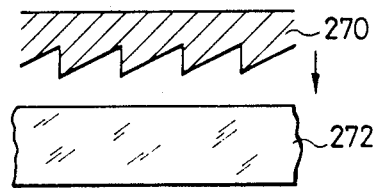

Subsequently, as shown in FIG. 35, compression transfer is effected on a plastic material 272 such as acryl. By applying a suitable temperature and pressure to a mold 270 and acryl material 272 at this time, it is possible to faithfully transfer the relief structure of the metal mold 270 to the acryl material 272.

Figure 36:
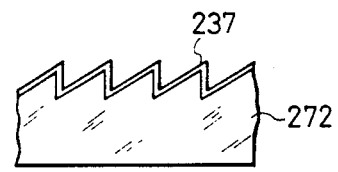

As shown in FIG. 36, a reflecting layer 273 is provided on the relief structure portion of the acryl material as by evaporation. The reflecting layer 273 may be of multi-layer structure or of single-layer structure. Also, it may be a dielectric film such as $MgF_2$, $TiO_2$, $ZrO_2$ or $SiO_2$ or a metal film such as Au, Ag, Al or Cu.

Figure 37:
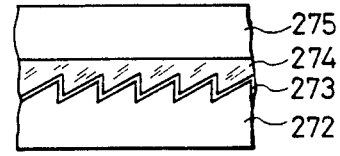

Next, as shown in FIG. 37, the relief portion is filled up with a substance 274 having a refractive index approximate to that of the acryl material 272. By providing a cover material 275 at this time, the surface can be made optically smooth. For this purpose, it is preferable that the substance 274 have an adhesive action and for example, an acrylic ultraviolet ray setting type adhesive agent is advantageous as the substance 274. The cover material 275 may be the same as the acryl material 272 or other substance (such as glass).

The beam splitter of the present invention is made by the above-described process.

In the foregoing, an example in which a metal mold is compression-transferred to an acryl material has been described as the diffraction grating structure, but as the method of making such a grating structure, not only the injection method but also epoxy materials or ultraviolet ray setting type adhesive agents are usable. If, in using these adhesive agents, a thin adhesive layer is formed on an acryl or glass substrate and relief copying is effected, it will be convenient for the planarity or smoothness of the surface of the beam splitter. Where the relief copying method using these adhesive agents is employed, there is also an advantage that the same adhesive agent as that used during the copying can be used as the cover adhesive agent 274 after the formation of the reflecting film.

Figure 38A:
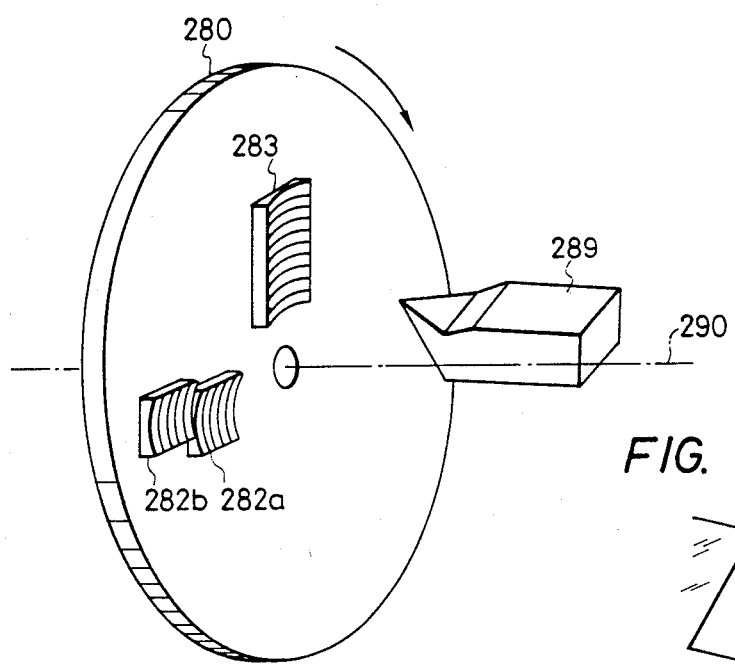
Figure 38B:

FIG. 38A and 38B show an example of the method of working a master frame grating for manufacturing the beam splitter shown in FIG. 23. A jig 280 for mounting a frame grating blank is mounted on the chuck portion of a precision lathe for rotating a workpiece with respect to a spindle 290, as shown in FIG. 38A, and this jig 280 is adapted to mount the elements 282$a$, 282$b$ and 283 of the frame grating at predetermined locations thereon. When the lathe is rotated and grating working is effected by a cutting tool 289, there can be obtained a frame grating which condenses a light beam at the predetermined position as shown in FIG. 23. FIG. 38B is an enlarged view of a portion of the frame grating 283.

A master grating can be obtained by combining and assembling the thus worked frame gratings 282$a$, 282$b$ and 283 on a holding substrate (not shown).

A case where, as in the beam splitter used in the fourth and fifth embodiments, light diffracted by the diffraction grating is directed to the photodetector while repeating total reflection in the beam splitter will now be considered.

Figure 39:
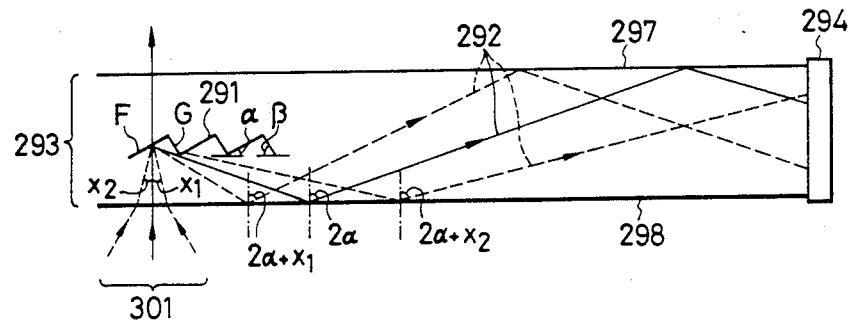
FIGS. 39 and 40 illustrate the optical path in a beam splitter.

FIG. 39 illustrates the optical path in the beam splitter. In FIG. 39, the light beams divided by the beam splitter 293 are propagated through the beam splitter 293 and directed to a photodetector 294. The beam splitter 293, as described above, has a reflecting film 291 such as a dielectric film provided on its surface of relief structure.

Here, in the relief structure, a reflecting inclined surface effective to form the divided light 292 is F and the other inclined surface is G. Further, the angle formed by the inclined surface F with respect to a plane in which the diffraction grating exists is $\alpha$, and the angle formed by the inclined surface G with respect to the same plane is $\beta$.

When a light beam 301 enters the beam splitter 293 from therebelow, it is partly reflected by the inclined surface F and travels toward the lower surface 298 of the beam splitter 293 (or toward the upper surface 297 depending on the inclination of the inclined surface F) and is reflected by the lower surface 298 (or the upper surface 297), and is propagated through the beam splitter 293 while being totally reflected by the upper surface 297 (the lower surface 298) and the lower surface 298 (the upper surface 297) of the beam splitter 293, and arrives at the photodetector 294 and is detected thereby.

If, as described above, the condition is so set that the light is totally reflected by the lower surface or the upper surface of the beam splitter 293, there are the following advantages. By the light being totally reflected, the transmitted component becomes null and the loss of the light amount during the reflection is null and thus, the efficiency of propagation to the photodetector can be increased. Also, the effect of condensing the light in the direction of thickness of the beam splitter can be achieved by the beam splitter of the present invention using the total reflection.

The effect of totally reflecting the light is great as described above, whereas the optical head device tracks and focuses the disc information and therefore, the reflected light does not always enter under a predetermined condition, and it is necessary to satisfy a condition under which the light is totally reflected even when the angle of the incident light deviates. Such a condition will now be described.

In FIG. 39, if, of the light beams entering the beam splitter 293, the range of the angle of incidence x of the light beam that must be directed to the photodetector 294 by total reflection is $$x_1 \leq x \leq x_2 \ (x_1 < 0, \ x_2 > 0),$$

then the angle $\phi$ at which the light reflected by the reflecting inclined surface F enters the lower surface 298 of the beam splitter is $$2\alpha + x_1 \leq \phi \leq 2\alpha + x_2.$$

Accordingly, the condition for this light beam to be totally reflected is $$2\alpha + x_1 \geq \theta_c \ (\theta_c = \text{critical angle})$$

where $\phi_c = \arcsin(1/n)$. That is, if $\alpha \geq \frac{1}{2}(\theta_c - x_1)$, all the light beam will be totally reflected by the lower surface 298.

Giving a similar consideration also to a case where the incident light beam 301 travels toward the upper surface 297 after reflected by the inclined surface F, there is obtained a condition that $$\alpha \leq \frac{1}{2}(180° - \theta_c - x_2)$$

and by combining the two conditions, the following is obtained:

$$\frac{1}{2}(\theta_c - x_1) \leq \alpha \leq \frac{1}{2}(180° - \theta_c - x_2)$$

This is the condition for the total reflection within the designated range of x.

Also, if the light beam diffracted by the diffraction grating structure again enters the diffraction grating structure, part of the light beam originally directed to the photodetector will be bent in another direction and harmful light will be created.

Figure 40:
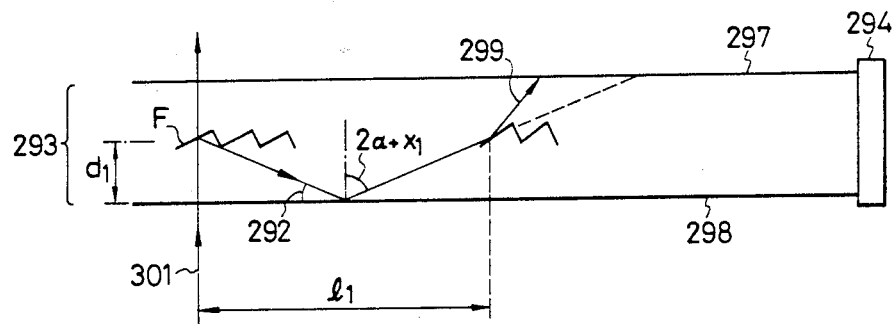

FIG. 40 shows the manner in which such harmful light is created. The reflected light beam 301 from the optical disc is reflected by the reflecting inclined surface F and totally reflected by the lower surface 298 of the beam splitter, whereafter it is again reflected by the reflecting inclined surface F on the relief surface at another location and creates a harmful light beam 299.

When such harmful light beam 299 is created, the light beam to be originally directed to the photodetector 294 is decreased and not only the S/N ratio of the signal is reduced, but also drift occurs to the focus error signal and the tracking error signal, and this in turn leads to a serious disadvantage that right auto-focus operation and auto-tracking operation are not performed.

As simple methods of preventing this harmful light beam 299 from being created, there are a method of approximating the angle of inclination $\alpha$ of the reflecting inclined surface F to 45° and a method of suitably thickening the thickness of the beam splitter 293. The former method is self-evident and therefore, the latter method will hereinafter be described.

When, in FIG. 40, the angle of inclination of the reflecting inclined surface F is $\alpha$ and the thickness of the lower side of the grating is $d_1$ and the horizontal length of the diffracted light beam 292 until it is reflected by the lower surface 298 and impinges on another grating is $l_1$, the following relation is established between $d_1$ and $l_1$:

$$l_1 = 2d_1 \tan(2\alpha + x_1)$$

Now, in the optical head device, an attempt is made to find a design condition under which the harmful light beam 299 is not created in a case where it is assumed that the focal length f of the objective lens is $f = 4.5$ mm and $N_1A_1 = 0.47$ and the vertical vibration of the disc surface is +20 $\mu$m.

For the +20 $\mu$m movement of the disc surface, the outermost light beam which is greatest in the variation in angle creates an angle variation of ±0.24°. Assuming a case where the refractive index of the beam splitter 293 is n = 1.5 and light enters the beam splitter 293 substantially perpendicularly thereto, the effective diameter of the light beam for which $x_1 = -0.16°$ is $4.5 \times 0.47 \times 2 = 4.23$ mm$\phi$ and therefore, when $l_1 = 5$ mm, $d_1$ is calculated in the following manner:

$$d_1 = l_1 / 2\tan(2\alpha + x_1)$$
$$= 5/2 \cdot \tan(2 \cdot 35° - 0.16°)$$
$$= 0.92 \text{ (mm)}.$$

Accordingly, the thickness of the lower side of the beam splitter may be 0.92 mm or more.

Where, in the optical head device of the present invention, the semiconductor laser as previously described is used as the light source, the wavelength of the light source is varied by the variation in environmental temperature and the fluctuation of the driving current during the use. The influence of such variation in the wavelength will hereinafter be described.

Figure 41:
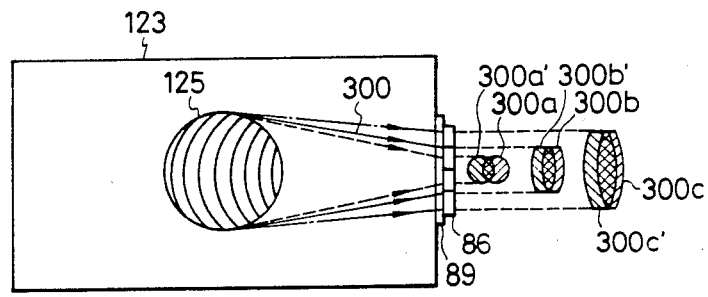
FIG. 41 is a schematic plan view of the beam splitter.

FIG. 41 is a view of the beam splitter 123 in the fifth embodiment shown in FIG. 16 as it is seen from the semiconductor laser 71 side. Assume that a fluctuation has occurred in the wavelength of the semiconductor laser light source 71. The direction of travel of the diffracted light 300 fluctuates slightly. Of the light amount distributions shown in FIGS. 41 and 42, reference characters $300a'$, $300b'$ and $300c'$ designate the light amount distributions occurring when the wavelength of the light source fluctuates. The variation in direction caused by this wavelength fluctuation is in the direction in which the light is diffracted by the diffraction grating and thus, in FIG. 42, the light amount distributions $300a'$, $300b'$ and $300c'$ fluctuate vertically of the light amount distributions $300a'$, $300b'$ and $300c'$ in a case where there is no fluctuation. By making the photodetecting surfaces $86a$, $86b$, $86c$ and $86d$ of the photodetector 123 with relatively great dimensions in the direction in which the light beam travels for this wavelength fluctuation, as shown in FIG. 42, and making the dividing line of each photodetecting surface parallel to said direction, the output of each photodetecting portion is hardly affected even if a wavelength fluctuation of the light source occurs, and thus, right auto-focus and auto-tracking can be accomplished.

If, as shown in FIG. 43A, the dimensions are not relatively great in the direction in which the light beam travels or if, as shown in FIG. 43B, the dividing lines of the photodetecting surfaces $86a$, $86b$, $86c$ and $86d$ are not parallel to the direction in which the light beam travels, there will occur an inconvenience that the light amount received by the entire photodetector 86 is decreased and the outputs of the photodetecting surfaces $86a$, $86b$, $86c$ and $86d$ are varied by the wavelength fluctuation of the light source.

Actually, however, in the embodiment of FIG. 16, the beam splitter 123 functions as illustrated in FIG. 44 to eliminate the above-mentioned inconvenience. Light beam 300 and light beam 300' represent diffracted light of adjacent orders, for example, 17th-order diffracted light and 18th-order diffracted light. These diffracted light beam travel while repeating total reflection on the surfaces of parallel flat plates 124 and 126 and enter the photodetector 86. By thus directing the diffracted lights from the diffraction grating of the beam splitter 123 to the photodetector 86 while causing them to be totally reflected in the beam splitter, the actually effective sizes of the photodetecting surfaces of the photodetector 86 in the direction of fluctuation of the light beam can be enlarged by several times.

Another method for solving the aforementioned problem will hereinafter be described by reference to FIGS. 45 and 46.

Figure 45:
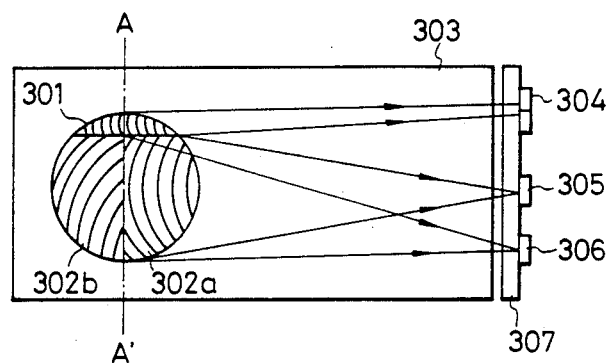
FIGS. 45 and 46 are schematic views showing a modification of the beam splitter.
Figure 46:
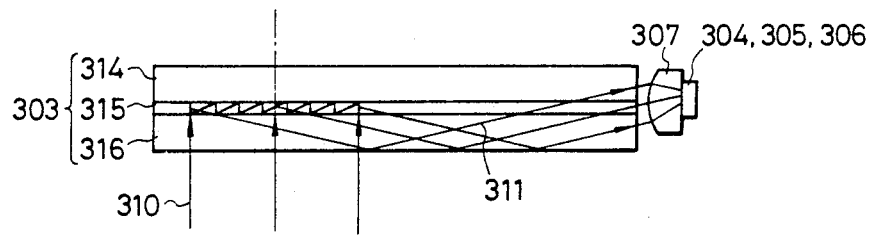

FIGS. 45 and 46 are a top plan view and a side view, respectively, showing the construction of the beam splitter used in the present invention. In the present embodiment the diffraction grating on the beam splitter 303 is divided into frame gratings 302a, 302b and 301, and the respective frame gratings diffract or reflect the light beam while converging it so as to form focal lines in different directions. The light beam from the frame grating 301 is waveguided through the beam splitter, is condensed in a direction perpendicular to the plane of the drawing sheet by an optical system 307 (such as a cylindrical lens) having different reduction percentages in two directions, and is detected by a two-division photodetector 304. Also, the dividing line between the frame gratings 302a and 302b is coincident with the direction AA' of the track image. The diffracted light beams from of the frame gratings 301, 302a and 302b, as shown in FIG. 46, are waveguided through the beam splitter 303 while repeating total reflection, whereafter the diffracted light beam are reduced more in the direction of fluctuation than in the other direction by the optical system 307 having different reduction percentages in two directions and are condensed on the photodetecting surfaces of photodetectors 304, 305 and 306. By this method, the dimensions of the photodetecting surfaces relative to the direction of fluctuation of the diffracted ligth beams are made substantially great.

Also, by thus making the areas of the photodetecting surfaces of the photodetectors small, it becomes possible to reduce the electrical capacity, and this also leads to an advantage that an optical head having a high C/N ratio up to a high signal frequency band can be constructed.

Figure 47:
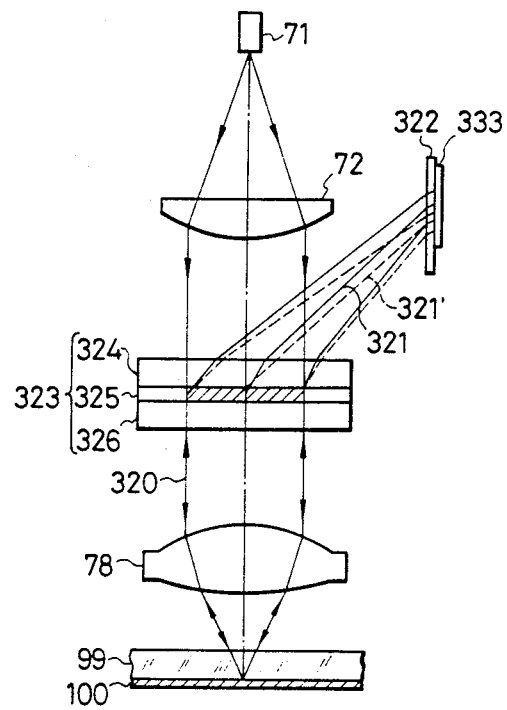
FIG. 47 is a schematic view showing the construction of a seventh embodiment of the present invention.

Also, in the case of the second embodiment of FIG. 7 in which the diffracted light is not waveguided through the beam splitter, a construction as shown in FIG. 47 may be adopted for the fluctuation of the diffracted light. FIG. 47 shows a seventh embodiment of the optical head of the present invention. In FIG. 47, members similar to those in FIG. 7 are given similar reference numerals and need not be described in detail. The reflected light 320 from a recording surface 100 enters a beam splitter 323 comprised of parallel flat plates 324 and 326 and a diffraction grating 325, is diffracted as indicated by a diffracted light 321 and is detected by a photodetector 333 through an analyzer 322. Now, when the oscillated wavelength of a semiconductor laser 71 has become long, the angle at which the diffracted light 321 is created becomes great in proportion to this variation in the wavelength and as a result, the diffracted light 321′ creates a light spot at a location near the beam splitter 323.

Figure 48:
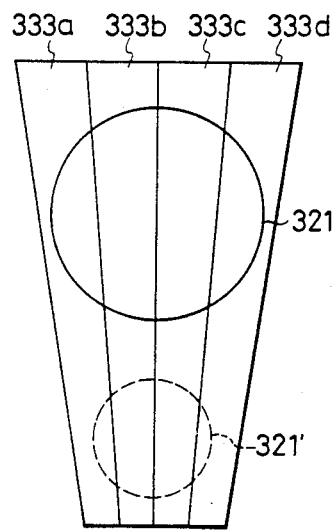
FIG. 48 shows the light-receiving surface of the photodetector in the embodiment shown in FIG. 47.
Figure 49:
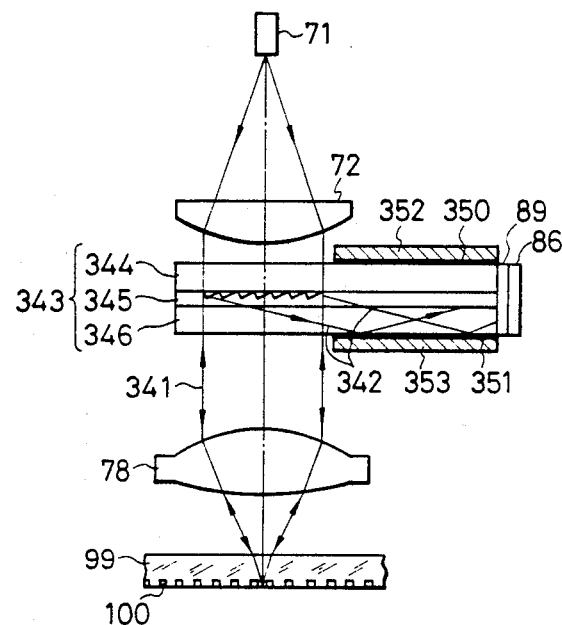
FIG. 49 is a schematic view showing the construction of an eighth embodiment of the present invention.

FIG. 48 shows the relation between a method of dividing a photodetector 333 and the light spot. Even if the light spot 321 changes to the light spot 321′, no drift of the operating point AF will occur because the dividing line of the photodetector 333 is set in a direction in which the diffracted light is displaced by the wavelength fluctuation of the light source.

Where the optical head device of the present invention is used for the reading of the information on an opto-magnetic recording medium and moreover diffracted light is directed to a photodetector while being totally reflected in a beam splitter as shown in FIG. 7, a phase difference occurs between the P-polarized light component and the S-polarized light component of the diffracted light. If this phase difference is too great, the diffracted light may become an elliptically polarized light beam and in some cases, the S/N ratio may be reduced. FIG. 49 shows the construction of an eighth embodiment of the present invention in which such a change in the polarized state is suppressed. In FIG. 49, members similar to those in FIG. 16 are given similar reference numerals and need not be described in detail.

In FIG. 49, reflecting films 350 and 351 are formed on the portions of the upper surface of a parallel flat plate 344 and the lower surface of a parallel flat plate 346 which do not provide the optical path of the light from a semiconductor laser 71. Further, protective films 352 and 353 may be provided on the reflecting films 350 and 351 as required, to thereby prevent the reflecting films 350 and 351 from being deteriorated or contaminated. The reflecting films 350 and 351 may be thin films of a metal such as silver, aluminum or chromium, or multi-layer films comprising a high refractive index layer (for example, ZnS or CeO$_2$) and a low refractive index layer (for example, MgF$_2$) designed so as not to vary the polarized state. Said metallic thin films can be very easily formed by a conventional method and moreover can sufficiently suppress the variation in the polarized state of the reflected light. On the other hand, said designed multi-layer films can reliably eliminate any variation in the polarized state of the reflected light.

First, the P-polarized light beam emitted from the semiconductor laser 71 is transmitted through a collimator lens 72, a beam splitter 343 and an objective lens 78 and is condensed on an information recording surface 100 formed on a substrate 99 and forms a spot thereon. During the recording, a pit is formed on the information recording surface 100 by the semiconductor laser 71 being modulated.

When the spot is formed on the recording surface 100 on which information is magnetically recorded, the plane of polarization of the reflected light 341 thereof is rotated correspondingly to the recorded information by the magnetic Kerr effect (Kerr rotation). Then, the reflected light 341 including the recorded information as a variation in the polarized state is diffracted by the diffraction grating 345 of the beam splitter 343 and becomes a diffracted light beam 342. The diffracted light 342 is directed while being repeatedly reflected by the reflecting film 350 or 351 and enters a photodetector 86 through an analyzer 89. As already described, the recorded information is converted into a variation in light amount by the analyzer 89, and that variation in light amount is converted into an electrical signal by the photodetector 86.

In this manner, the diffracted light 342 including the recorded information as a variation in the polarized state is reflected by the reflecting film 350 or 351 and therefore, the polarized state of the diffracted light 342 hardly varies and the diffracted light 342 is directed to the analyzer 89 while keeping a polarized state exactly corresponding to the information recorded on the recording surface 100. Accordingly, the light entering the photodetector 86 through the analyzer 89 is an intermittent light exactly corresponding to the recorded information.

Figure 50:
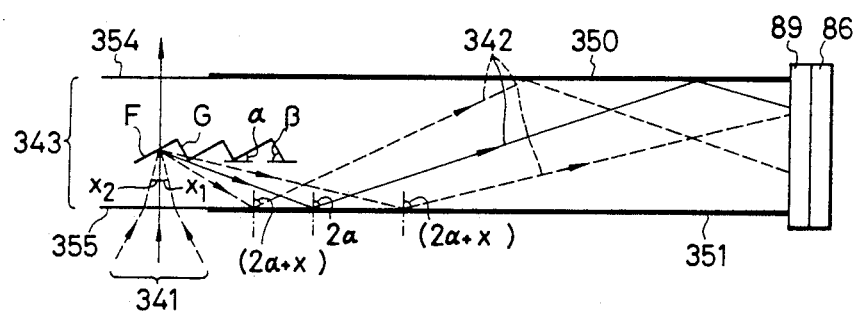
FIG. 50 illustrates the optical path in the beam splitter shown in FIG. 49.

FIG. 50 illustrates the optical path in the present embodiment.

In FIG. 50, the reflecting inclined surface of the diffraction grating 345 which is effective to form the diffracted light 342 is F and the other inclined surface is G. Further, the angle formed by the inclined surface F with respect to a plane in which the diffraction grating 345 exists is $\alpha$, and the angle formed by the inclined surface G with respect to the same plane is $\beta$.

The reflected light 341 from the information recording surface 100 enters the beam splitter 343 as a parallel light beam if the recording surface 100 is in the in-focus position. However, when the recording surface 100 deviates from the regular in-focus position, the reflected light 341 changes its shape from a parallel light beam and becomes a convergent or divergent light. Accordingly, the direction of incidence of the incident light 341 varies in conformity with the amount of deviation of the focus. That is, in FIG. 50, the angle of incidence x of the reflected light 341 onto the diffraction grating 345 has a certain range ($x_1 \leq x \leq x_2$) and therefore, the direction of travel of the diffracted light 342 also varies and the angle of incidence thereof onto the upper surface 354 of the parallel flat plate 344 or the lower surface 355 of the parallel flat plate 346 becomes different. Here, however, a direction perpendicular to the plane in which the diffraction grating 345 exists is the reference and $x_1$ is a negative value.

According to the present invention, however, the reflecting films 350 and 351 can be designed as multi-layer films which do not cause a phase difference for light beams having different angles of incidence x and therefore, in any case, the diffracted light 342 can be directed to the analyzer 89 without its polarized state being varied.

The diffraction grating 345 may be of the volume type or of the braze type, but in the case of the braze type diffraction grating, by designing the reflecting films 350 and 351 so as not to cause a phase difference even for diffracted light beams of other many orders than predetermined orders, photodetection can be effectively accomplished without losing the light amount.

The optical head device of the present invention is also applicable to the differential detection of signals. Such example will hereinafter be described.

Figure 51:
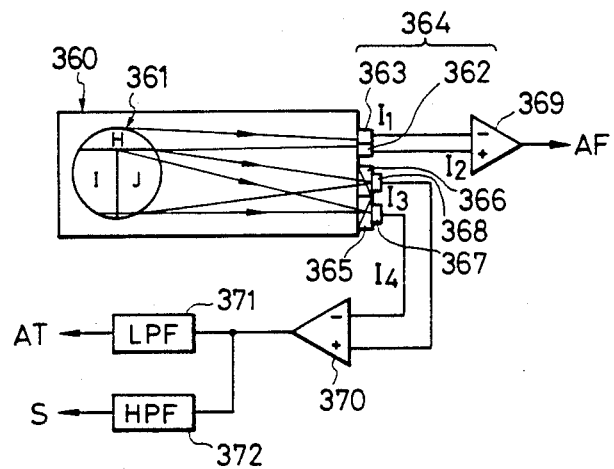
FIG. 51 is a schematic view showing an example of the construction of a beam splitter to which the differential detection method is applied.

FIG. 51 is a schematic plan view of a beam splitter to which the differential detection method is applied. In FIG. 51, the diffraction grating structure portion 361 of the beam splitter 360 is comprised of three divided areas H, I and J, as described in connection with FIG. 23. The light beam from the area H is substantially condensed on a two-division photosensor 364 and scans the light-receiving surfaces 362 and 363 thereof in accordance with the spacing between an objective lens and a recording medium. Also, the light beams divided from the areas I and J are transmitted through polarizing plates (polarizing elements) 365 and 366, respectively, and are substantially condensed on and enter photosensors 367 and 368, respectively. The polarizing transmission axes of the polarizing plates 365 and 366 are disposed substantially symmetrically (for example, at ±about 45° as shown in FIG. 52) with respect to the plane of polarization of the incident light beam. S/N may sometimes be increased when the angle of the transmission axes of the polarizing plates is set to an angle of 45° or greater depending on the kind of the noise of the opto-magnetic medium. In such cases, it is desirable that said angle be not limited to the vicinity of 45° but be set to an optimum angle for which S/N is greatest.

The advantages of this differential detection method will hereinafter be described.

Figures 52A, 52B:
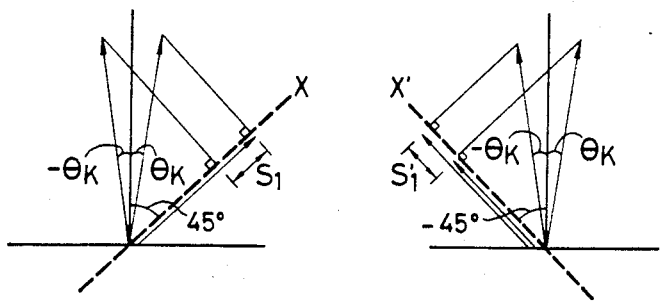
FIGS. 52A and 52B are model views of a signal amplitude component arriving at the photodetector shown in FIG. 51.

FIGS. 52A and 52B schematically show signal amplitude components which arrive at photodetectors 367 and 368, respectively. In these FIGS., if the ordinate represents the direction of polarization of the incident light beam, the light beam reflected from the recording medium has its plane of polarization rotated by $\theta_k$ or $-\theta_k$ depending on the direction (the upward direction or the downward direction) of the magnetized section of the opto-magnetic pattern. Here, the differences $S_1$ and $S_1'$ between the components projected onto the transmission axes x and x' (the axes indicated by broken lines inclined by ±45°) of the polarizing plates 365 and 366 are the signal amplitude components.

Figure 53A:
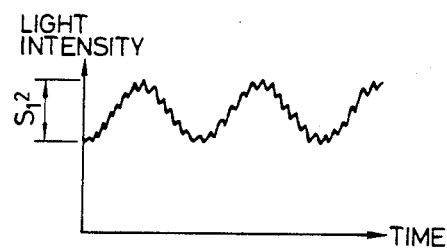
FIGS. 53A, 53B and 53C show the wave forms of signals detected from the photosensors shown in FIG. 51.
Figure 53B:
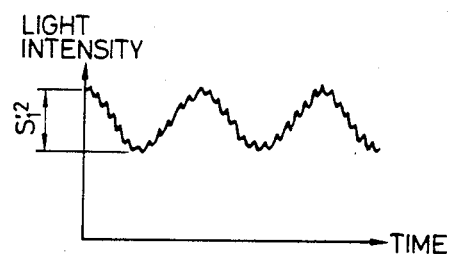

The angles of rotation $\theta_k$ and $-\theta_k$ are varied with time by the opto-magnetic pattern and therefore, the variations in the intensity of signals received by the photosensors 367 and 368 are 180° out of phase between the divided light beams as shown in FIGS. 53A and 53B.

The opto-magnetic signals are inverted in phase as described above, but usually, noise components (the noise from the recording medium, the sway noise of the light LDI, etc.) ride on these signals and these noise components of the same phase.

Figure 53C:
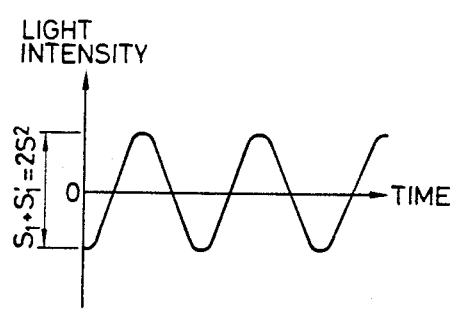

Accordingly, when the differential between the signals obtained from the sensors 367 and 368 is taken, the signal components strengthen each other and the noise components decrease and thus, if the optical system is accurately disposed, $S_1^2$ and $S_1'^2$ are equal to each other and the noise amplitudes also are equal to each other and therefore, the signals become two times and the noise becomes 0 (FIG. 53C).

Let it be assumed that electrical signals obtained from photosensors 362, 363, 365 and 366 are $I_1$, $I_2$, $I_3$ and $I_4$, respectively. Since AF and AT signals are usually low frequency components as compared with the information signal (AF and AT signals are 20 kHz or less and the information signal is several hundred kHz–several MHz), the average level of the opto-magnetic signals shown in FIGS. 53A and 53B may be taken into consideration.

That is, various desired signals are obtained by:
AF signal = low frequency component of $(I_1-I_2)$
AT signal = low frequency component of $(I_3-I_4)$
Information signal S = signal band component of $(I_3-I_4)$.

In FIG. 51, reference numeral 369 designates a differential amplifier for operating the AF signal, reference numeral 370 denotes a differential amplifier for operating the AT signal and the information signal, reference numeral 371 designates a low-pass filter for extracting the AT signal, and reference numeral 372 denotes a high-pass filter for extracting the information signal S.

The beam splitter used in the present invention can be combined with other optical elements (such as a lens and a prism) to further simplify the construction of the optical head device. Such an embodiment will hereinafter be desdribed. In the following embodiment, members similar to those in the previously described embodiments are given similar reference numerals and need not be described in detail.

Figure 54:
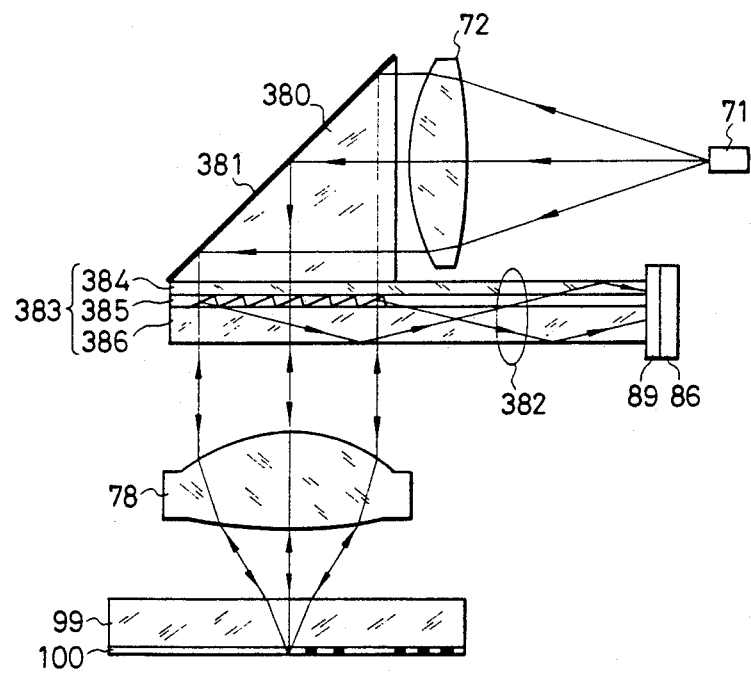
FIGS. 54 to 62 are schematic views showing the constructions of other embodiments of the present invention.

FIG. 54 shows a ninth embodiment of the present invention. The light beam emitted from a semiconductor laser 71 is made into a parallel light beam by a collimator lens, enters a bending prism 380, is bent by the reflecting surface 381 thereof and enters a beam splitter 383. The prism 380 is adhesively secured to a first parallel flat plate 384 forming the beam splitter 383. The light beam is transmitted through the parallel flat plate 384, a diffraction grating 385 and a parallel flat plate 386 and is condensed on an information recording medium 100 on a disc 99 by an objective lens 78.

Where the information recording medium 100 is an opto-magnetic medium, the reflected light causes Kerr rotation in conformity with the direction of magnetization. This reflected light beam is reflected by the diffraction grating 385 and becomes a light beam 382, which is transmitted through an analyzer 89 and enters a photodetector 86.

On the photodetector 86, auto-focus and auto-tracking are accomplished by the aforementioned various systems.

In the present embodiment, the prism 380 is integrally adhesively secured to the beam splitter 83 and therefore, it becomes possible to realize an optical head which does not require any extra member for holding parts and which is compact, light in weight and high in reliability.

There is also an advantage that the amount of reflection of light on the joined surface is small and the anti-reflection coating becomes almost unnecessary or a sufficient effect can be obtained by a simple film construction.

The embodiment described just above is such that a relief copy of the grating is taken on the parallel flat plate 386 which is a substrate by the use of thermosetting or ultraviolet ray setting type adhesive agent and a reflecting film is formed on the grating, whereafter the parallel flat plate 384 is adhesively secured thereto by the use of an adhesive agent of the same refractive index. The member used as the cover need not always be a parallel flat plate.

Figure 55:
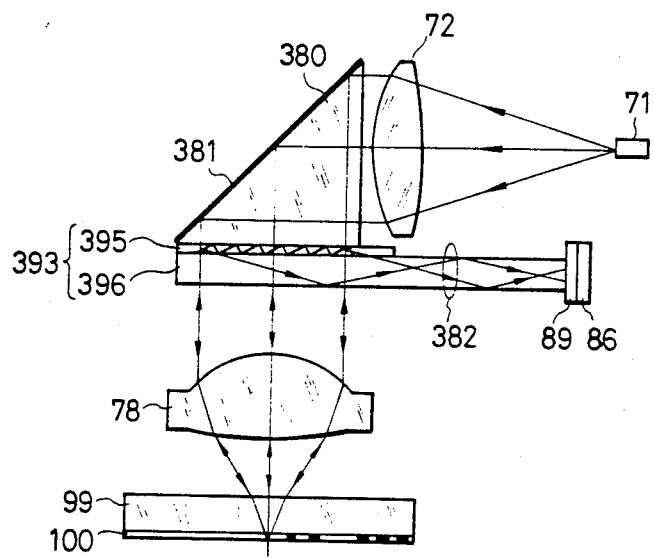

FIG. 55 shows a tenth embodiment of the present invention which is based on such a concept. An optical path bending prism 380 having a reflecting surface 381 is used as a cover when an adhesive agent layer of the same refractive index is formed on a diffraction grating 395. As a result of adopting such a construction, the number of optical members is decreased by one as compared with the previous emboidment and the number of joined surfaces is also decreased by one, whereby further compactness and lighter weight as well as higher reliability is achieved. Further, as a secondary effect of the present invention, there is also obtained an advantage that the light beam 382 directed to the photodetector 86 travels through a single optical member 396 and therefore the polarization of the light beam is little disturbed.

Figure 56:
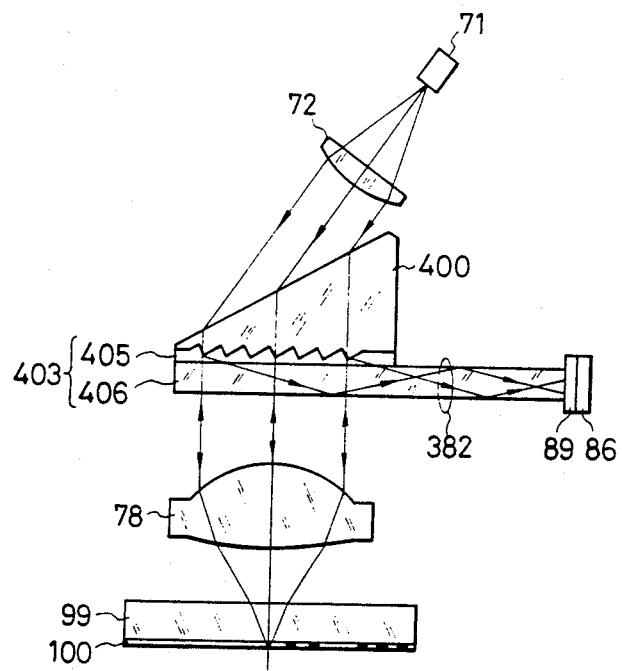

FIG. 56 illustrates an eleventh embodiment of the present invention. The light beam from a semiconductor laser 71 is made into a parallel light beam having a wide spatial intensity distribution in one direction by a collimator lens 72. This parallel light beam is refracted by a prism 400 and becomes a light beam having a substantially rotation-symmetrical intensity distribution, and is directed to an objective lens 78 with good transmission efficiency. In the present embodiment, a relief type diffraction grating is formed on the underside of the prism 400 as by the injection method or the compression method, and it is cemented to a parallel flat plate 406 by means of an adhesive agent 405 to thereby constitute a beam splitter 403.

Figure 57:
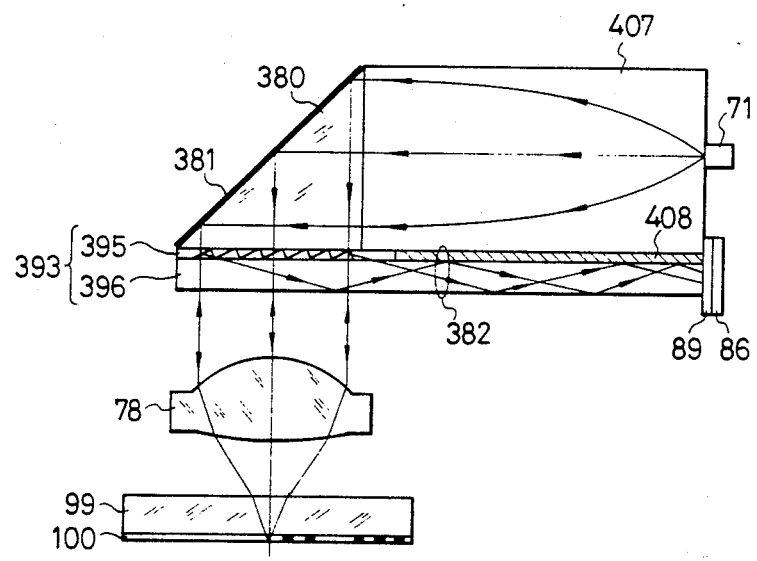

In a twelfth embodiment of the present invention shown in FIG. 57, a collimator lens 407 comprising an index distribution type lens is adhesively secured integrally with an optical path bending prism 380 and a semiconductor laser 71. A reflecting layer 408 may be formed on a parallel flat plate 396, as required.

Figure 58:
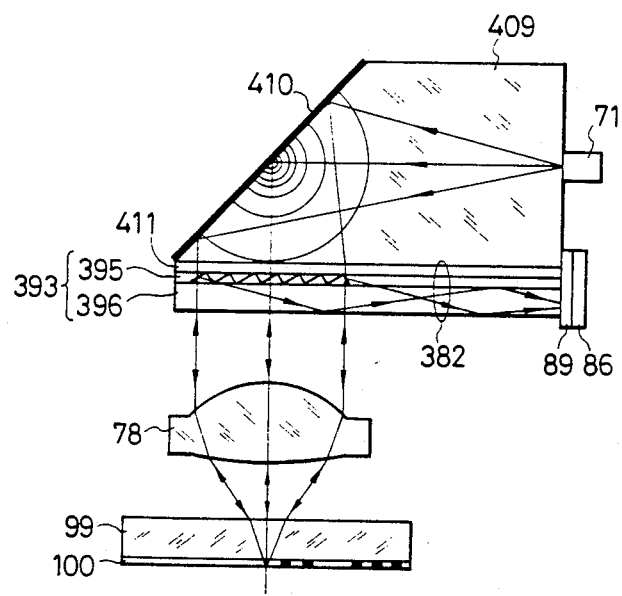

In an embodiment shown in FIG. 58, the collimator lens is comprised of a sphere-symmetrical index distribution lens 409 having a reflecting surface 410 on a plane passing through the center thereof. A coating substance or adhesive agent 411 of low refractive index is used to satisfy the total reflection condition in a parallel flat plate 396.

Figure 59:
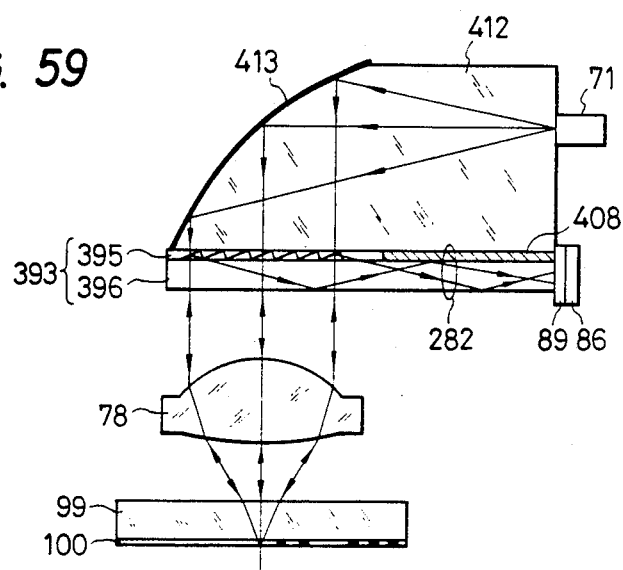

In FIG. 59, a parabolic mirror 413 is used as the collimator lens, and a diffraction grating 395 and a semiconductor laser 71 are adhesively secured to a glass block 412.

Figure 60:
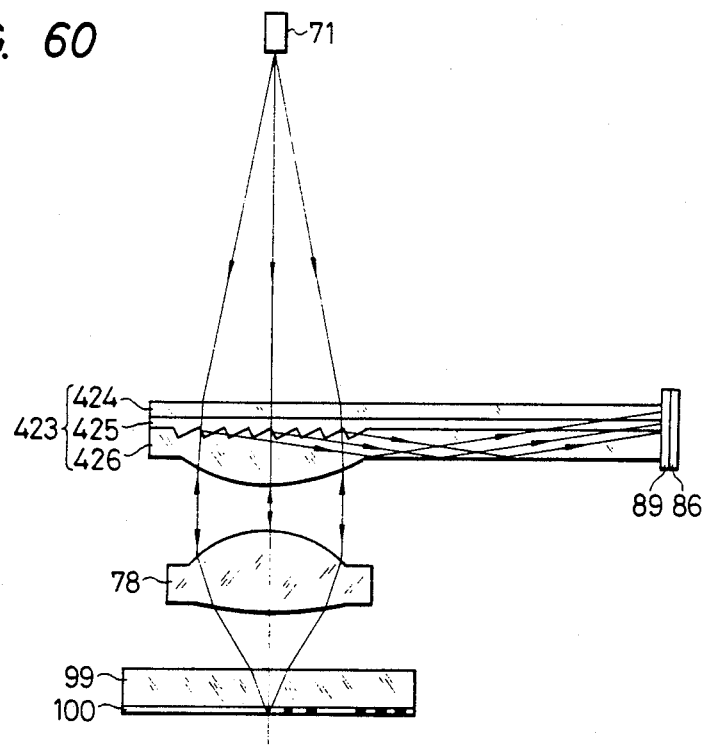

In FIG. 60, the diffraction grating is made relative to a plastic plate or a glass plate by the injection method or the compression method. One surface of an optical member 426 is in the form of a convex lens and provides a collimator lens, and a diffraction graitng is formed on the other surface of the optical member 426. The diffraction grating is provided by evaporating a reflecting film on a necessary area, and thereafter securing it to a parallel flat plate 424 by means of an adhesive agent 425 having substantially the same refractive index. By adopting such a construction, the number of parts can be further decreased. Also, if the focal length of the collimator lens is set long, there is obtained an advantage that the grating is a straight grating but can achieve the same function.

Figure 61:
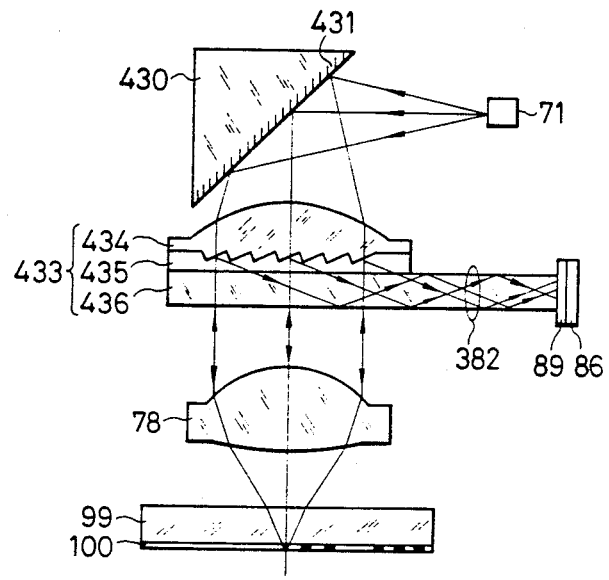

In an embodiment shown in FIG. 61, the light beam from a semiconductor laser 71 is reflected by the reflecting surface 431 of a bending mirror 430, whereafter it enters a collimator lens 434 and becomes a parallel light beam. On the underside of the collimator lens 434, a diffraction grating is formed during the injection or compression working, and this leads to an advantage that alignment of the optic axis of the lens and the dividing position of the grating surface can be accomplished accurately.

Figure 62:
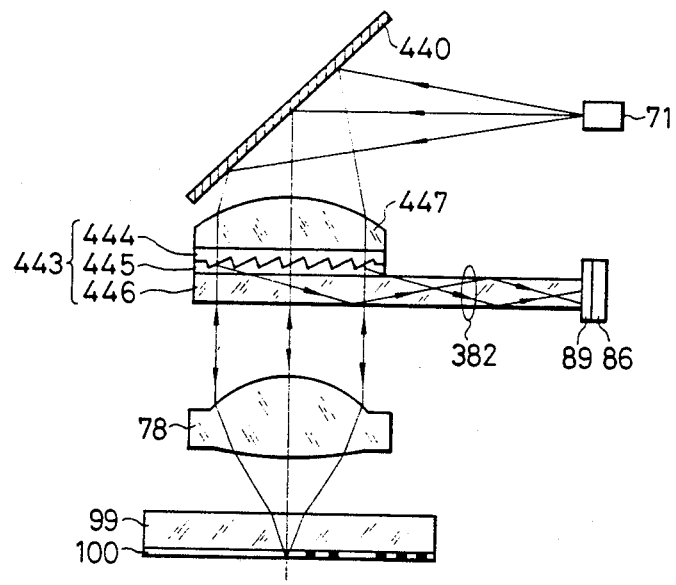

Also, as shown in FIG. 62, a collimator lens 447 may be adhesively cemented onto a diffraction grating 445 formed on a parallel flat plate 446 to constitute a beam splitter 443. The light from a semiconductor laser 71 is reflected by a reflecting plate 440 and directed to the beam splitter 443.

However, working a relief type diffraction grating on one surface of an optical member and working a lens on the other surface of the optical member by the compression method or the injection method leads to another preferable property. Generally, where a plastic material such as acryl is molded by the use of a metal mold, the stress applied to the member when parting from the metal mold has been a great cause of the reduced dimensional accuracy of parts. Particularly, in a case where a diffraction grating is formed on the central portion of one surface of a parallel flat plate, when the compression working is terminated and the member is stripped off from the mold, a bending stress is liable to occur because the member is held by the diffraction grating portion and the marginal portion of the member. As a result, even a slight difference in the friction force of the mold or even a slight difference in the temperature during the working may cause the amount of bend to be varied irregularly.

To prevent the occurrence of such a problem, the upper and lower surfaces of the same optical member may be endowed with a suitable structure to thereby prevent any bending stress from being imparted to the member. In the present embodiment, a relief type diffraction grating is formed on one surface of a single optical member and a non-spherical convex lens serving as a collimator lens is formed on the other surface of the optical member and therefore, during the parting, a tensile stress is created with respect to the central portion of the member. Thus, the member is not subjected to an unreasonable bending stress and the working of optical parts of good surface accuracy is achieved.

The optical head device of the present invention is not limited to the above-described embodiments, but permits other various applications thereof.

We claim:

1. An optical head device comprising:
   a light source;
   condensing means for condensing a light beam emitted from said light source on an optical recording medium;
   a diffraction grating arranged in the optical path of an incident light beam entering the recording medium from said light source to transmit the incident light beam through said diffraction grating and to diffract light reflected from the recording medium for separating the reflected light from the incident light beam; and
   a photodetector for receiving the light diffracted by said diffraction grating, said photodetector including a light receiving surface which is divided into a plurality of areas by at least a dividing line extending substantially in a direction in which a spot of the light diffracted by said diffraction grating moves on said light receiving surface due to the wavelength fluctuation of said light source.

2. An optical head device according to claim 1, wherein sid diffraction grating of said beam splitter is a relief type diffraction grating comprising first and second transparent members having substantially the same refractive index, at least one of said transparent members having a plurality of inclined surfaces, and a reflecting film of polarization dependency provided on the boundary surface between said transparent members.

3. An optical head device according to claim 2, wherein said light source emits a linearly polarized light and a phase plate is further provided between said beam splitter and said recording medium.

4. An optical head device according to claim 1, wherein said optical recording medium is an optomagnetic recording medium and said diffraction grating of said beam splitter is a volume type diffraction grating for diffracting the reflected light from said recording medium at an angle in one of the ranges of 20°–80° and 100°–158°.

5. An optical head device according to claim 4, wherein said volume type diffraction grating diffracts said reflected light at an angle in one of the ranges of 33°–72° and 108°–147°.

6. An optical head device according to claim 1, wherein said diffraction grating has a lens action of varying the wave surface shape when diffracting said reflected light, and causing said reflected light to diverge or converge.

7. An optical head device according to claim 1, wherein said diffraction grating of said beam splitter is divided into a plurality of areas on which different grating patterns are formed.

8. An optical head device according to claim 7, wherein said diffraction grating has two areas divided by a segment in a direction coincident with the direction of extension of a track formed on said recording medium, and said photodetector has two light-receiving portions for detecting the lights diffracted by said areas, and means for differentiating the output signals of said light-receiving portions and obtaining a tracking error signal.

9. An optical head device according to claim 7, wherein said photodetector has two light-receiving portions for detecting the light diffracted by one of said divided areas, and means for differentiating the output signals of said light-receiving portions and obtaining a focus error signal.

10. An optical head device according to claim 7, wherein said optical recording medium is an optomagnetic recording medium and said photodetector has two light-receiving portions for detecting the lights diffracted by two of said areas, two polarizing plates of different transmission axis azimuths disposed in the optical paths of the lights detected by said light-receiving portions, and means for differentiating the output signals of said light-receiving portions.

11. An optical head device according to claim 10, wherein said two areas are divided by a segment in a direction coincident with the direction of extension of a track formed on said recording medium, and said photodetector further has means for frequency-separating said differentiated signals and obtaining an information signal and a tracking error signal.

12. An optical head device according to claim 1, wherein said beam splitter is planar in shape and the light diffracted by said diffraction grating is waveguided through said beam splitter while repeatedly undergoing total reflection.

13. An optical head device according to claim 12, wherein said photodetector is formed on an end surface of said beam splitter.

14. An optical head device according to claim 12, wherein said optical recording medium is an optomagnetic recording medium, and a reflecting film for preventing the polarized state of the diffracted light from being varied is formed on that surface of said beam splitter on which the diffracted light is totally reflected.

15. An optical head device according to claim 1, wherein the light-receiving surface of said photodetector is formed into such a shape that the length in a direction in which the diffracted light by said diffraction grating travels by the wavelength fluctuation of said light source is greater than the length in a direction perpendicular thereto.

16. An optical head device according to claim 1, wherein an optical system for reducing and condensing the diffracted light by said diffraction grating in a direction in which said diffracted light travels by the wavelength fluctuation of said light source from a direction perpendicular thereto is provided between said diffraction grating and said photodetector.

17. An optical head device according to claim 1, wherein a prism for deflecting the light emitted from said light source is formed integrally with said beam splitter.

18. An optical head device according to claim 17, wherein said beam splitter has a relief type diffraction grating injection-molded or compression-molded on one surface of said prism.

19. An optical head device according to claim 1, wherein a collimator lens for collimating the light emitted from said light source is formed integrally with said beam splitter.

20. An optical head device according to claim 19, wherein said beam splitter has a relief type diffraction grating injection-molded or compression-molded on one surface of said collimator lens.

* * * * *

UNITED STATES PATENT AND TRADEMARK OFFICE
CERTIFICATE OF CORRECTION

PATENT NO. : 4,733,065  
DATED : March 22, 1988  
INVENTOR(S) : HIROAKI HOSHI, ET AL.

Page 1 of 5

It is certified that error appears in the above-identified patent and that said Letters Patent is hereby corrected as shown below:

Title page:

AT [57] IN THE ABSTRACT

Line 10, "light" (second occurrence) should be deleted.

COLUMN 1

Line 50, "to" should be deleted.
Line 61, "the" (first occurrence) should be deleted.
Line 62, "accompanying" should read --the accompanying--.

COLUMN 2

Line 4, "remaining" should read --the remaining--.
Line 5, "the" (second occurrence) should be deleted.
Line 27, "highly" should read --very--.

COLUMN 3

Line 30, "or" should read --of--.

COLUMN 4

Line 45, "semicondcu-" should read --semiconduc---.
Line 46, "during" should be deleted.

COLUMN 6

Line 43, "FIGS. 11(A), (B) and (C)" should read --FIGS. 11A, 11B and 11C--.
Line 61, "focusing" should read --focusing on--.

UNITED STATES PATENT AND TRADEMARK OFFICE
CERTIFICATE OF CORRECTION

PATENT NO. : 4,733,065
DATED : March 22, 1988
INVENTOR(S) : HIROAKI HOSHI, ET AL.

It is certified that error appears in the above-identified patent and that said Letters Patent is hereby corrected as shown below:

COLUMN 7

Line 10, "tarnsmis-" should read --transmis---.

COLUMN 8

Line 21, "and" should be deleted.
    Line 49, "re-" should be deleted.
    Line 50, "flected light" should read --light reflected--.

COLUMN 10

Line 33, "photodetector" should read --beam splitter--.
    Line 65, "FIGS. 11(A), (B) and (C)" should read --FIGS. 11A, 11B and 11C--.
    Line 68, "(C)" should read --11C--.

COLUMN 11

Line 57, "comformity" should read --conformity--.

COLUMN 12

Line 6, "p-polarized" should read --P-polarized--.

COLUMN 15

Line 17, "FIGS 20A-C" should read --FIGS. 20A and 20B--.
    Line 29, "IF" should read --$I_F$--.
    Line 53, "FIGS. 20A-C," should read --FIGS. 20A and 20B,--.

UNITED STATES PATENT AND TRADEMARK OFFICE
CERTIFICATE OF CORRECTION

PATENT NO. : 4,733,065

DATED : March 22, 1988

INVENTOR(S) : HIROAKI HOSHI, ET AL.

It is certified that error appears in the above-identified patent and that said Letters Patent is hereby corrected as shown below:

COLUMN 16

Line 14, "FIGS. 20A-C," should read --FIGS. 20A and 20B,--.
Line 30, "FIGS. 20A-C." should read --FIGS. 20A and 20B.--.

COLUMN 17

Line 4, "20A-C" should read --20A and 20B--.
Line 6, "185a, 186b" should read --185a, 185b--.
Line 13, "conicident" should read --coincident--.
Line 18, "$I_C$and" should read --$I_C$ and--.

COLUMN 18

Line 8, "FIGS. 20A-C." should read --FIGS. 20A and 20B.--.
Line 33, "quarter wavelength" should read --quarter-wavelength--.

COLUMN 23

Line 25, "FIG. 38A and 38B" should read --FIGS. 38A and 38B--.

COLUMN 24

Line 45, "reflected" should read --being reflected--.

COLUMN 25

Line 29, "+20 μm." should read --±20 μm.--.
Line 30, "+20 μm" should read --±20 μm--.

UNITED STATES PATENT AND TRADEMARK OFFICE
CERTIFICATE OF CORRECTION

PATENT NO. : 4,733,065
DATED : March 22, 1988
INVENTOR(S) : HIROAKI HOSHI, ET AL.

It is certified that error appears in the above-identified patent and that said Letters Patent is hereby corrected as shown below:

COLUMN 26

Line 2, "300a', 300b' and 300c'" should read --300a, 300b and 300c--.
Line 29, "beam" should read --beams--.
Line 31, "lights" should read --light beams--.
Line 43, "invention. In" should read --invention. ¶ In--.
Line 58, "of" should be deleted.
Line 61, "beam" should read --beams--.
Line 68, "ligth" should read --light--.

COLUMN 28

Line 54, "$(X_1 \leq x \leq x2)$" should read --$(X_1 \leq X \leq X_2)$--.

COLUMN 29

Line 5, "other many" should read --many other--.

COLUMN 30

Line 26, "desdribed." should read --described.--.
Line 33, "lens," should read --lens 72,--.
Line 52, "beam splitter 83" should read --beam splitter 383--.

COLUMN 31

Line 10, "emboidment" should read --embodiment--.
Line 54, "graitng" should read --grating--.

UNITED STATES PATENT AND TRADEMARK OFFICE
CERTIFICATE OF CORRECTION

PATENT NO. : 4,733,065

DATED : March 22, 1988

INVENTOR(S) : HIROAKI HOSHI, ET AL.

It is certified that error appears in the above-identified patent and that said Letters Patent is hereby corrected as shown below:

<u>COLUMN 33</u>

Line 2, "sid" should read --said--.

Signed and Sealed this

Tenth Day of January, 1989

Attest:

DONALD J. QUIGG

*Attesting Officer*   *Commissioner of Patents and Trademarks*